United States Patent
Yang et al.

(10) Patent No.: US 9,693,293 B2
(45) Date of Patent: Jun. 27, 2017

(54) DEVICE-ANCHOR BASE STATIONS

(71) Applicant: Telefonaktiebolaget L M Ericsson (publ), Stockholm (SE)

(72) Inventors: Yu Yang, Solna (SE); Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 360 days.

(21) Appl. No.: 14/165,948

(22) Filed: Jan. 28, 2014

(65) Prior Publication Data

US 2014/0219192 A1    Aug. 7, 2014

Related U.S. Application Data

(60) Provisional application No. 61/760,454, filed on Feb. 4, 2013, provisional application No. 61/760,462, filed on Feb. 4, 2013.

(51) Int. Cl.
    *H04W 4/00*         (2009.01)
    *H04W 48/20*       (2009.01)

(52) U.S. Cl.
    CPC .................... *H04W 48/20* (2013.01)

(58) Field of Classification Search
    CPC ...... H04W 4/005; H04W 88/04; H04W 72/04
    See application file for complete search history.

(56) References Cited

U.S. PATENT DOCUMENTS

2003/0179721 A1    9/2003    Shurmantine et al.
2009/0219849 A1    9/2009    Alpert et al.
(Continued)

FOREIGN PATENT DOCUMENTS

EP    1594278 A1    9/2005
EP    1780951 A2    5/2007
(Continued)

OTHER PUBLICATIONS

Author Unknown, "3rd Generation Partnership Project; Technical Specification Group Radio Access Network; Evolved Universal Terrestrial Radio Access (E-UTRA); User Equipment (UE) radio transmission and reception (Release 11)," Technical Specification 36.101, Version 11.3.0, Dec. 2012, 3GPP Organizational Partners, 392 pages.

(Continued)

*Primary Examiner* — Shaq Taha
(74) *Attorney, Agent, or Firm* — Withrow & Terranova, PLLC

(57) ABSTRACT

Systems and methods are disclosed for providing efficient and reliable communication for wireless devices, e.g., Machine Type Communication devices, in a cellular communications network. In one embodiment, a network node of the cellular communications network identifies candidate device-anchor base stations, where the candidate device-anchor base stations are wireless devices that satisfy one or more predefined criteria for serving as a candidate device-anchor base station. The network node then effects selection of a device-anchor base station for a wireless device from the candidate device-anchor base stations such that communication between a serving base station of the wireless device and the wireless device is via the device-anchor base station. In this manner, communication between the wireless device and the serving base station of the wireless device is assisted by the device-anchor base station.

29 Claims, 25 Drawing Sheets

(56) References Cited

U.S. PATENT DOCUMENTS

| | | | |
|---|---|---|---|
| 2009/0290555 | A1 | 11/2009 | Alpert et al. |
| 2009/0291686 | A1 | 11/2009 | Alpert et al. |
| 2010/0069070 | A1 | 3/2010 | Shi et al. |
| 2010/0105404 | A1 | 4/2010 | Palanki et al. |
| 2010/0167743 | A1 | 7/2010 | Palanki et al. |
| 2010/0169498 | A1* | 7/2010 | Palanki ............... H04W 16/14 709/228 |
| 2012/0140724 | A1 | 6/2012 | Sipola et al. |
| 2012/0190392 | A1 | 7/2012 | Aminaka et al. |
| 2014/0073317 | A1* | 3/2014 | Zhou ............... H04W 28/0205 455/424 |
| 2014/0073343 | A1* | 3/2014 | Nagaraja ............... H04W 72/04 455/453 |
| 2014/0094127 | A1 | 4/2014 | Dimou et al. |
| 2014/0185465 | A1 | 7/2014 | Balachandran et al. |

FOREIGN PATENT DOCUMENTS

| | | |
|---|---|---|
| WO | 2010006650 A1 | 1/2010 |
| WO | 2010051838 A1 | 5/2010 |
| WO | 2011153507 A2 | 12/2011 |
| WO | 2012011786 A2 | 1/2012 |

OTHER PUBLICATIONS

Author Unknown, "3rd Generation Partnership Project; Technical Specification Group Radio Access Network; Evolved Universal Terrestrial Radio Access (E-UTRA); Base Station (BS) radio transmission and reception (Release 11)," Technical Specification 36.104, Version 11.3.1, Jan. 2013, 3GPP Organizational Partners, 133 pages.
Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.2.0, Dec. 2012, 3GPP Organizational Partners, 340 pages.
International Search Report and Written Opinon for PCT/IB2014/058763, mailed Jun. 18, 2014, 12 pages.
International Search Report and Written Opinon for PCT/IB2014/058766, mailed Jun. 20, 2014, 12 pages.
Non-Final Office Action for U.S. Appl. No. 14/165,961, mailed Feb. 26, 2016, 12 pages.
International Preliminary Report on Patentability for International Patent Application No. PCT/IB2014/058763, mailed Aug. 13, 2015, 9 pages.
International Preliminary Report on Patentability for International Patent Application No. PCT/IB2014/058766, mailed Aug. 13, 2015, 9 pages.
Final Office Action for U.S. Appl. No. 14/165,961, mailed Oct. 17, 2016, 10 pages.
Office Action for Mexican Patent Application No. MX/a/2015/010010, mailed Aug. 5, 2016, 5 pages.
Examination Report for European Patent Application No. 14711307.0, mailed Apr. 12, 2017, 6 pages.

* cited by examiner

| INFORMATION ELEMENTS | |
|---|---|
| MESSAGE TYPE | RRC CONNECTION REQUEST |
| UE IDENTITY | CHOICE |
| | S-TMSI |
| | RANDOM VALUE |
| ESTABLISHMENT CAUSE | CHOICE |
| | EMERGENCY |
| | HIGH PRIORITY ACCESS |
| | MOBILE TERMINAL ACCESS |
| | MOBILE ORIGINATING SIGNALING |
| | MOBILE ORIGINATING DATA |
| UE CAPABILITY INFORMATION | CHOICE |
| | POWER SUPPLY ACCESS (YES/NO) |
| | MAXIMUM OUTPUT POWER |
| | PACKET SIZE |
| | PERIODICITY |
| | START TIME OFFSET |
| | MOBILITY PATTERN (STATIC, LOW, MEDIUM, HIGH MOBILITY) |
| | ABILITY TO OPERATE AS RX & TX IN BOTH UL & DL |
| | ABILITY TO OPERATE AS RELAY/REPEATER |

FIG. 10

| INFORMATION ELEMENTS | |
|---|---|
| MESSAGE TYPE | RRC CONNECTION REQUEST |
| UE IDENTITY | CHOICE |
| | S-TMSI |
| | RANDOM VALUE |
| ESTABLISHMENT CAUSE | CHOICE |
| | EMERGENCY |
| | HIGH PRIORITY ACCESS |
| | MOBILE TERMINAL ACCESS |
| | MOBILE ORIGINATING SIGNALING |
| | MOBILE ORIGINATING DATA |
| UE CAPABILITY INFORMATION | CHOICE |
| | POWER SUPPLY ACCESS |
| | MAXIMUM OUTPUT POWER |
| | PACKET SIZE |
| | PERIODICITY |
| | START TIME OFFSET |
| | MOBILITY PATTERN (STATIC, LOW, MEDIUM, HIGH MOBILITY) |

FIG. 16

| INFORMATION ELEMENTS | |
|---|---|
| MESSAGE TYPE | RRC CONNECTION REQUEST |
| UE IDENTITY | CHOICE |
| | S-TMSI |
| | RANDOM VALUE |
| ESTABLISHMENT CAUSE | CHOICE |
| | EMERGENCY |
| | HIGH PRIORITY ACCESS |
| | MOBILE TERMINAL ACCESS |
| | MOBILE ORIGINATING SIGNALING |
| | MOBILE ORIGINATING DATA |
| LOCATION INFORMATION | LOCATION COORDINATES |

FIG. 20

DEVICE-ANCHOR BASE STATIONS

RELATED APPLICATIONS

This application claims the benefit of provisional patent application Ser. No. 61/760,454, filed Feb. 4, 2013, and provisional patent application Ser. No. 61/760,462, filed Feb. 4, 2013, the disclosures of which are hereby incorporated herein by reference in their entireties.

This application is related to U.S. patent application Ser. No. 14/165,961, entitled DEVICE-ANCHOR BASE STATION SELECTION AND DETECTION, which was filed Jan. 28, 2014, which is commonly owned and assigned and is hereby incorporated herein by reference in its entirety.

FIELD OF THE DISCLOSURE

The present disclosure relates to a cellular communications network and more particularly relates to systems and methods for utilizing wireless devices as device-anchor base stations to maintain efficient and reliable communication within a cellular communications network.

BACKGROUND

In recent years, there has been a dramatic increase in the study and use of Machine-to-Machine (M2M) communication and/or the deployment of Machine Type Communication (MTC) devices in cellular communications networks. As used herein, an MTC device is a wireless device that performs MTC or M2M communication. The use of these MTC devices can be a great opportunity for telecommunication operators to extend their network without significant costs. In M2M communications, MTC devices such as smart meters, signboards, cameras, remote sensors, laptops, and appliances are connected to the cellular communications network. Many MTC devices sporadically transmit one or a few short packets containing measurements, reports, or triggers such as, for example, temperature, humidity, wind speed, etc. In most cases, MTC devices are expected to have low mobility, e.g., they are static. MTC devices are often of low complexity, targeting low-end (e.g., low average revenue per user, low data rate, high latency tolerance) applications. For typical applications, the power/energy consumption for such MTC devices is expected to be low as well.

One of the distinguishing characteristics in cellular communications networks with M2M communication is that there is a large increase in the number of wireless devices (i.e., there are typically a large number of MTC devices). This can lead to the cellular communications network becoming over-loaded, which in turn can cause the cellular communications network to be unable to fully support the requested communications services. In addition, the MTC devices can be installed indoor or underground where the propagation conditions can be significantly degraded (i.e., some MTC devices may be located in coverage holes). It may therefore be difficult for MTC devices located in such coverage holes to maintain efficient and reliable communication with the cellular communications network.

As such, there is a need for systems and methods that provide efficient and reliable communication for MTC devices located in coverage holes. In addition, there is a need for systems and methods that address potential high load conditions when a large number of MTC devices are in a cellular communications network.

SUMMARY

The present disclosure relates to systems and methods for providing efficient and reliable communication for wireless devices, e.g., Machine Type Communication (MTC) devices, in a cellular communications network. In one embodiment, a network node of the cellular communications network identifies candidate device-anchor base stations, where the candidate device-anchor base stations are wireless devices that satisfy one or more predefined criteria for serving as a candidate device-anchor base station. The network node then effects selection of a device-anchor base station for a wireless device from the candidate device-anchor base stations such that communication between a serving base station of the wireless device and the wireless device is via the device-anchor base station. In this manner, communication between the wireless device and the serving base station of the wireless device is assisted by the device-anchor base station. This is particularly beneficial where the wireless device is in need of assistance due to, for example, being located in a coverage hole or high cell load conditions.

In one embodiment, identifying the candidate device-anchor base stations includes selecting the candidate device-anchor base stations at the network node. Further, in one embodiment, selecting the candidate device-anchor base stations at the network node includes obtaining information that is indicative of capabilities of a second wireless device, determining whether the second wireless device satisfies one or more predefined criteria for being a candidate device-anchor base station based on the information, and selecting the second wireless device as a candidate device-anchor base station if the second wireless device is determined to satisfy the one or more predefined criteria for being a candidate device-anchor base station. Still further, in one embodiment, obtaining the information includes obtaining the information that is indicative of the capabilities of the second wireless device from the second wireless device. In one embodiment, the information is obtained from the second wireless device via one or more Information Elements (IEs) received from the second wireless device via Radio Resource Control (RRC) signaling. In another embodiment, obtaining the information includes receiving information that is indicative of a device type of the second wireless device, wherein the device type of the second wireless device is indicative of the capabilities of the second wireless device.

In one embodiment, identifying the candidate device-anchor base stations includes receiving information from a second wireless device that is indicative of whether the second wireless device is selected as a candidate device-anchor base station.

In one embodiment, the network node is further configured to determine that assistance from device-anchor base stations is needed in a cell served by the serving base station of the wireless device, wherein the network node identifies the candidate device-anchor base stations for the cell served by the serving base station. In one embodiment, the network node identifies the candidate device-anchor base stations in response to determining that assistance from device-anchor base stations is needed in the cell served by the serving base station of the wireless device. In one embodiment, the network node determines that assistance from device-anchor base stations is needed in the cell if one or more coverage holes are located in the cell.

Further, in one embodiment, the network node is further configured to determine that there are one or more predefined coverage holes located in the cell and, in response, determine that assistance from device-anchor base stations is needed in the cell. In another embodiment, the network node is further configured to receive information from one or more wireless devices that indicates that the one or more wireless devices have detected one or more coverage holes in the cell and, in response, determine that assistance from device-anchor base stations is needed in the cell. In another embodiment, the network node is further configured to detect one or more coverage holes in the cell and, in response, determine that assistance from device-anchor base stations is needed in the cell.

In one embodiment, at least one of the one or more coverage holes is a partial coverage hole. In one embodiment, the network node is further configured to detect the partial coverage hole in response to a predefined number of consecutive unsuccessful Physical Uplink Shared Channel (PUSCH) transmissions from a second wireless device when the second wireless device is located in the partial coverage hole.

In one embodiment, the network node is further configured to detect the one or more coverage holes in the cell based on one or more Radio Link Failure (RLF) reports for radio link failures that occurred in the coverage hole. In another embodiment, the network node is further configured to detect the one or more coverage holes in the cell based on at least one of a group consisting of: received power with respect to a second wireless device when the second wireless device is located in the coverage hole, Signal-to-Interference plus Noise Ratio (SINR) with respect to the second wireless device when the second wireless device is located in the coverage hole, and Hybrid Automatic Repeat Request (HARQ) NACK rate with respect to the second wireless device when the second wireless device is located in the coverage hole.

In another embodiment, the network node is further configured to detect the one or more coverage holes in the cell in response to a second wireless device operating in a coverage enhancement mode of operation when located in the coverage hole. In another embodiment, the network node is further configured to detect the one or more coverage holes in the cell in response to failed communication with a second wireless device when the second wireless device is located in the coverage hole.

In another embodiment, the network node is further configured to determine that assistance from device-anchor base stations is needed in the cell if a network load for the cell is greater than a predefined threshold representative of a high network load.

In another embodiment, the network node is further configured to determine that assistance from device-anchor base stations is needed in the cell in response to a predefined number of consecutive random access attempts from a second wireless device.

In one embodiment, the wireless device is an MTC device located in a coverage hole. In another embodiment, the wireless device is an MTC device and a network load of a cell served by the serving base station of the wireless device is greater than a predefined threshold representative of a high network load.

In one embodiment, a wireless device in a cellular communications network is configured to select the wireless device as a candidate device-anchor base station and, in response, notify the cellular communications network that the wireless device is a candidate device-anchor base station.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 10 illustrates some examples of Information Elements (IEs) containing capability information for a wireless device according to one embodiment of the present disclosure;

FIG. 16 illustrates one example of IEs utilized to provide information regarding a traffic pattern of a wireless device to the cellular communications network according to one embodiment of the present disclosure;

Figure 1:
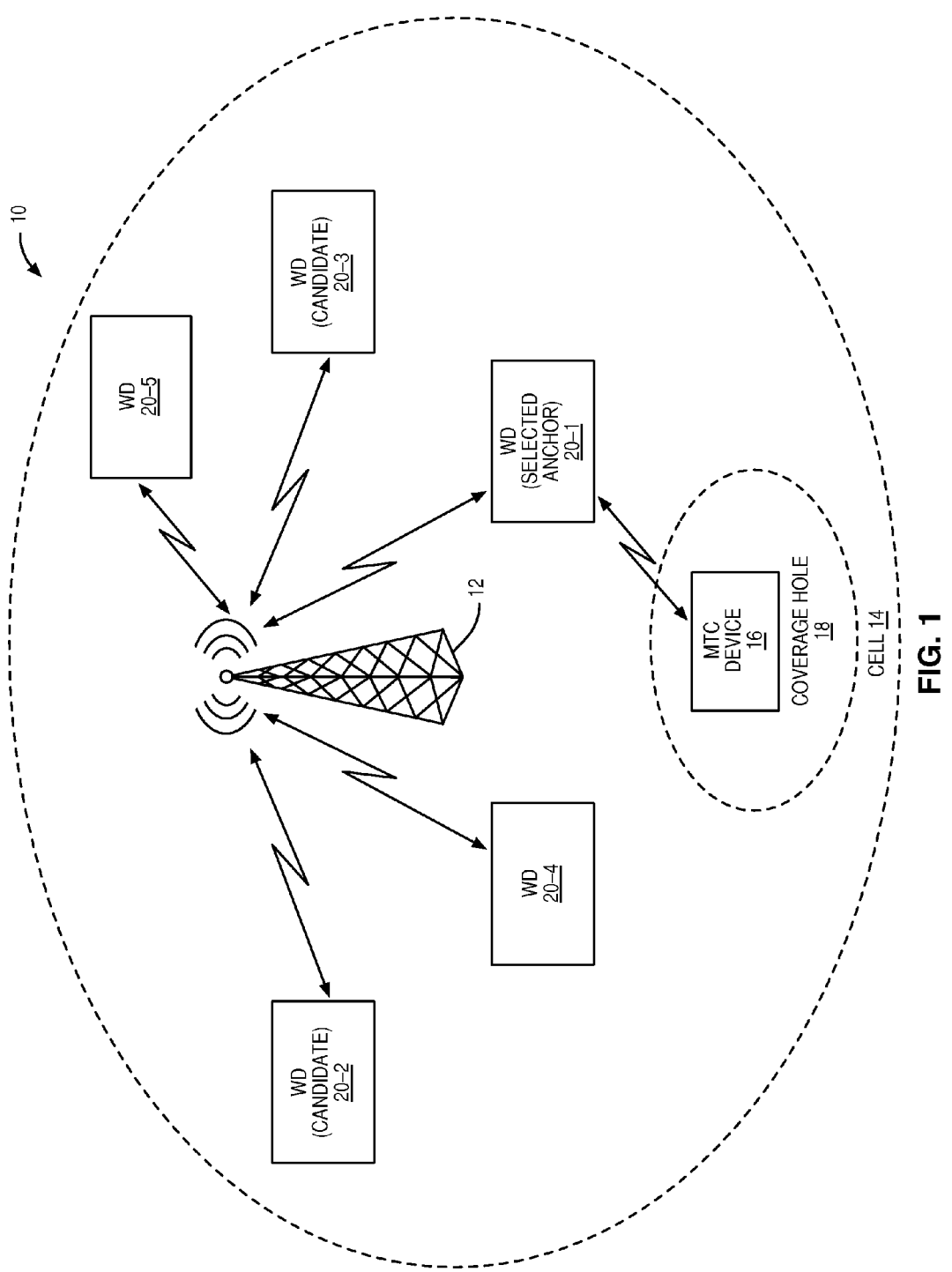
FIG. 1 illustrates a cellular communications network in which a device-anchor base station is utilized to assist with communications between a Machine Type Communication (MTC) device and a serving base station of the MTC device according to one embodiment of the present disclosure.
Figure 17:
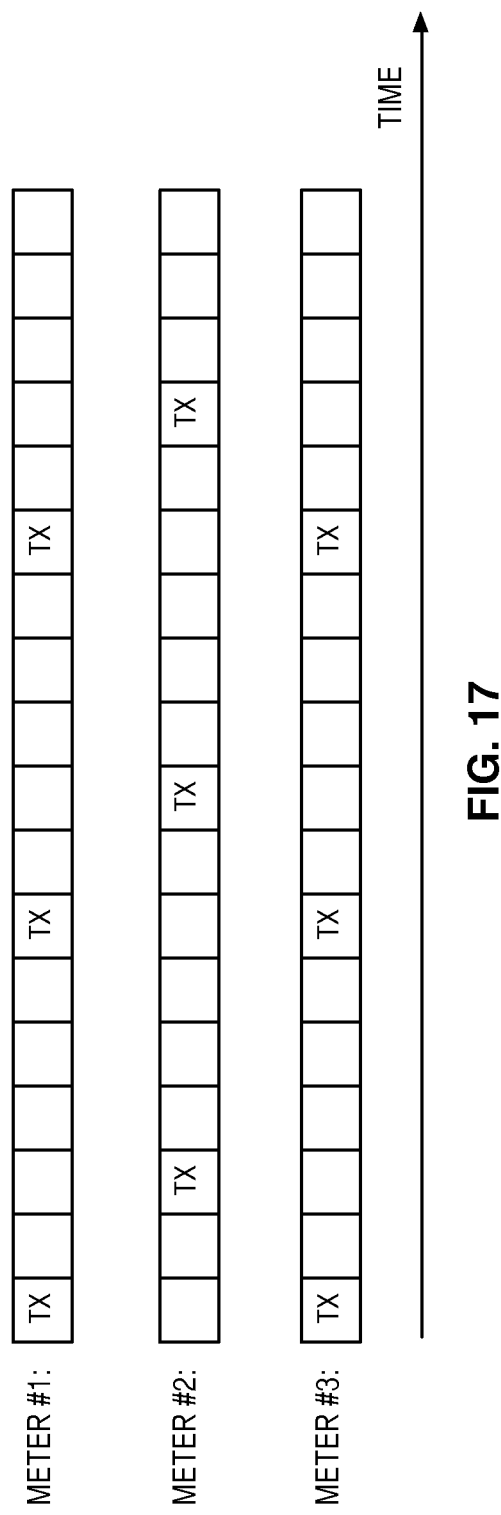
Figure 18:
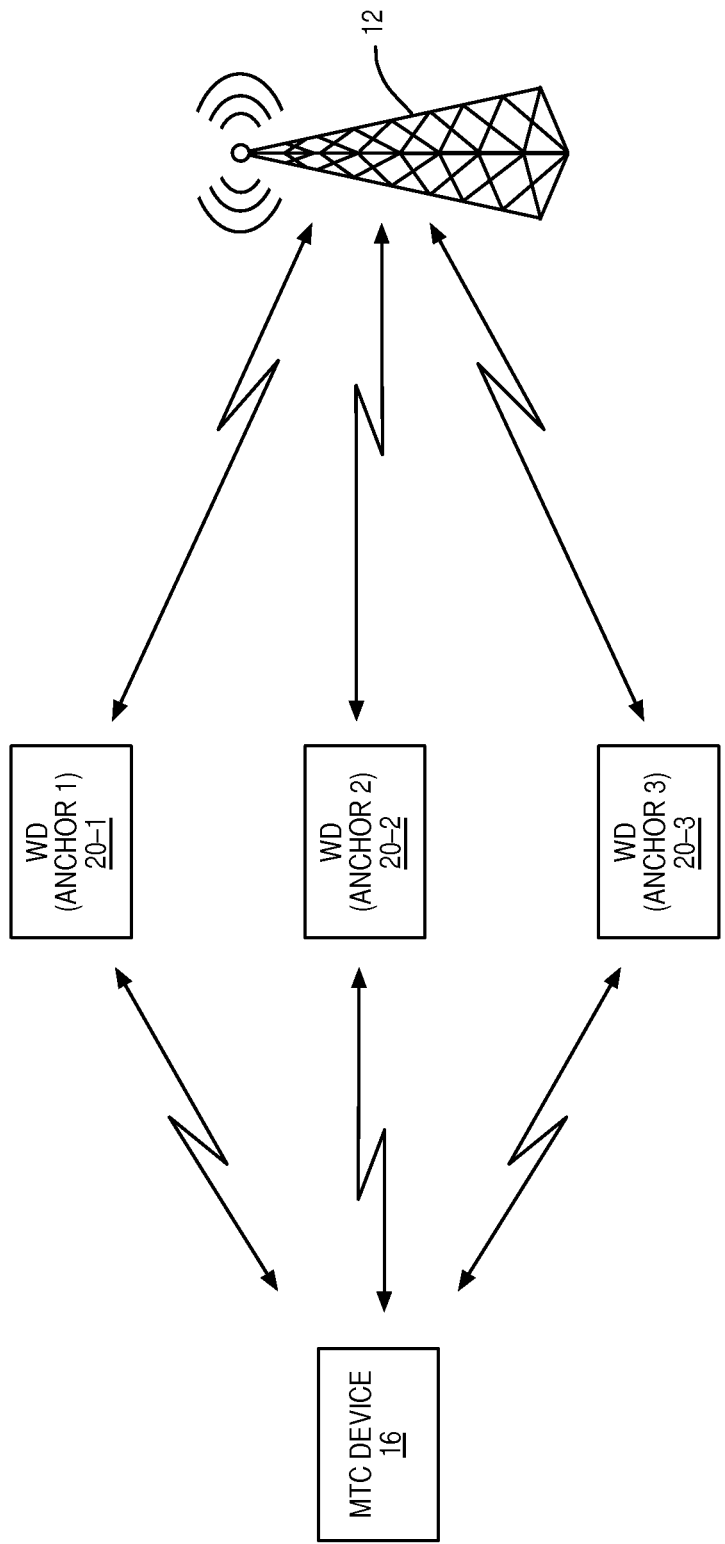
Figure 19:
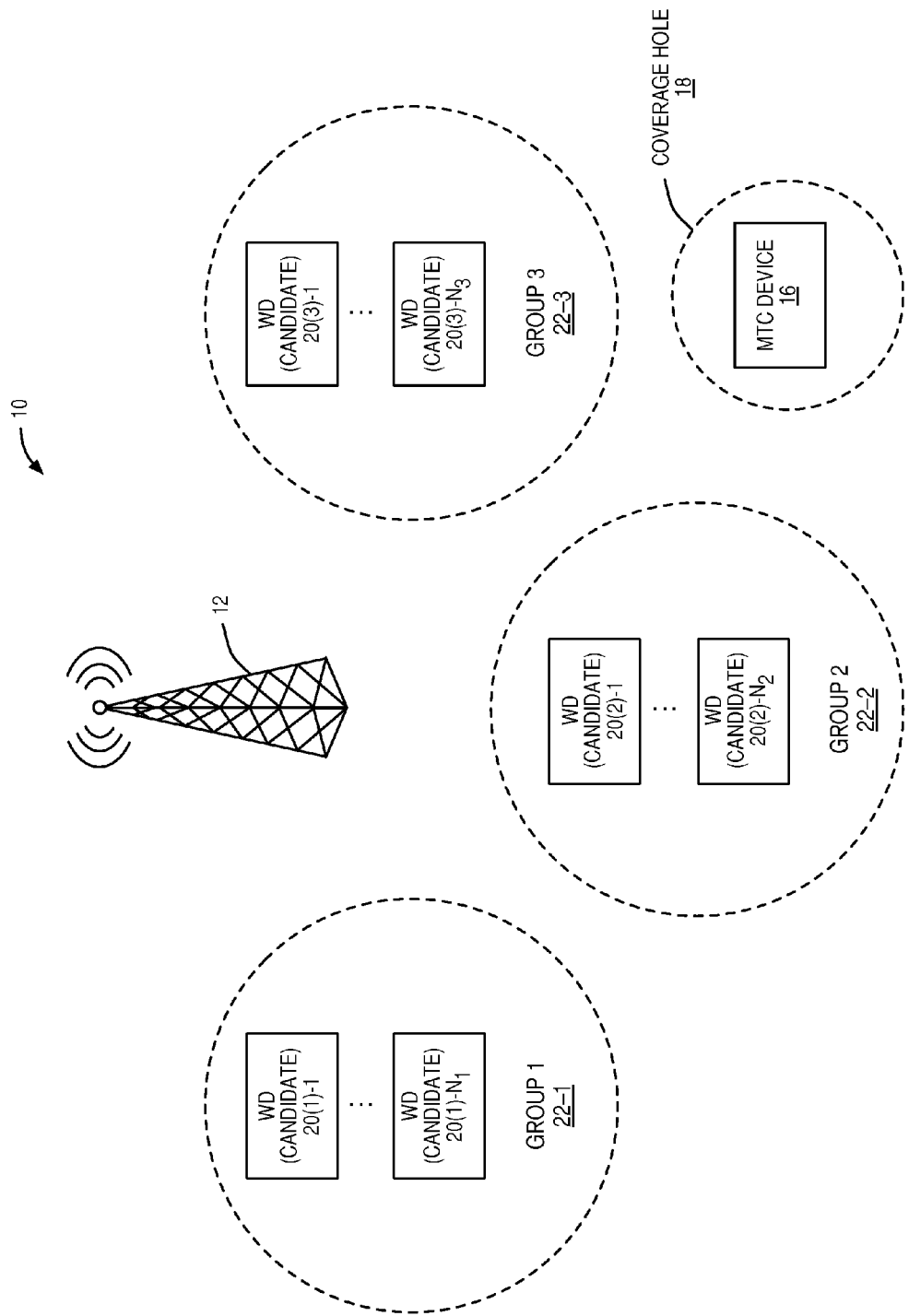
Figure 21:
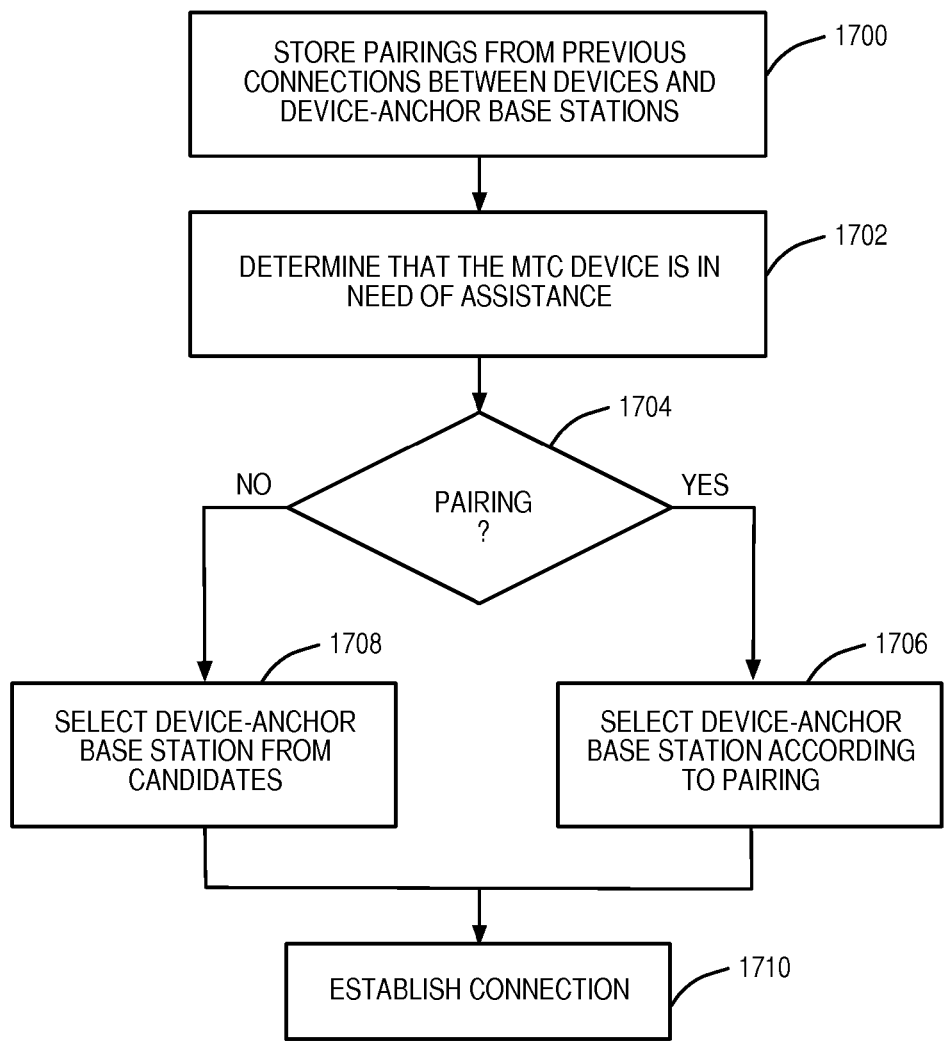
Figure 22:
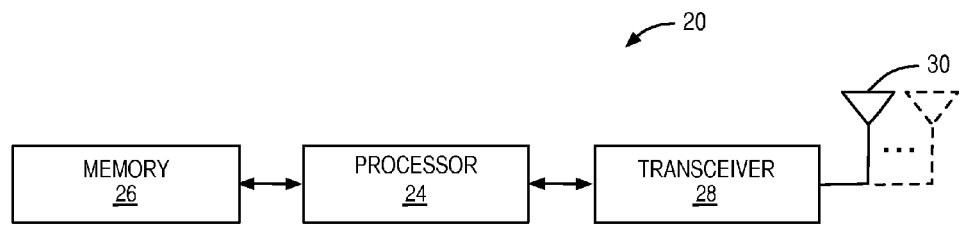
Figure 23:
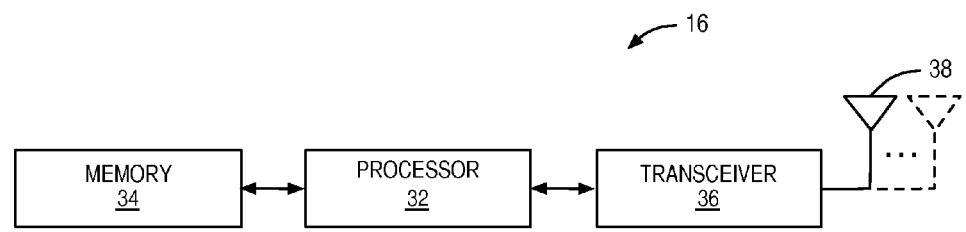
Figure 24:
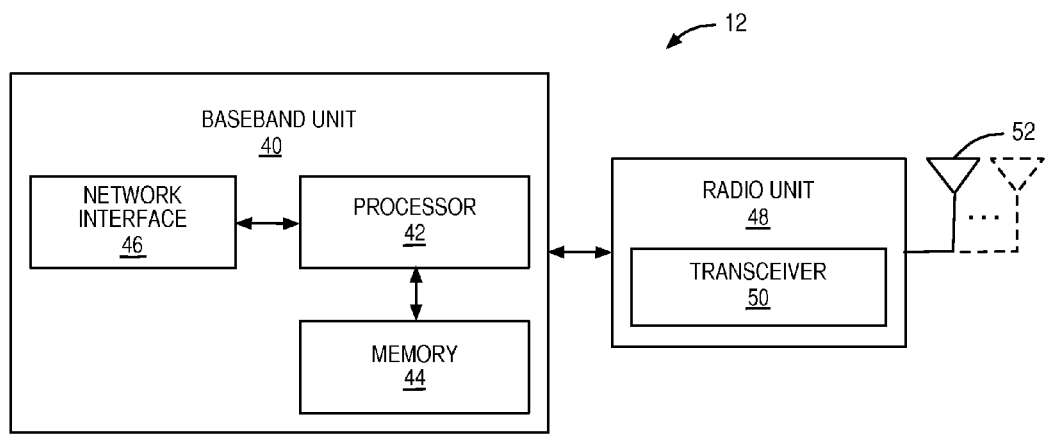

FIG. 17 graphically illustrates one example of a traffic pattern of the MTC device and traffic patterns of two candidate device-anchor base stations, where the traffic patterns can co-exist such that either or both of the two candidate device-anchor base stations can serve as the device-anchor base station of the MTC device according to one embodiment of the present disclosure;

FIG. 18 illustrates an embodiment where multiple device-anchor base stations are selected for the MTC device and operate to enable communication between the MTC device and the serving base station of the MTC device using a multi-point communication scheme;

FIG. 19 illustrates an embodiment in which candidate device-anchor base stations are grouped according to one embodiment of the present disclosure;

FIG. 20 illustrates one example of IEs that provide information to the cellular communications network that enables grouping of the candidate device-anchor base stations according to one embodiment of the present disclosure;

FIG. 21 illustrates a process by which device-anchor base station and wireless device pairing are stored and utilized to select device-anchor base stations according to one embodiment of the present disclosure;

FIG. 22 is a block diagram of one of the wireless devices of FIG. 1 according to one embodiment of the present disclosure;

FIG. 23 is a block diagram of the MTC device of FIG. 1 according to one embodiment of the present disclosure; and FIG. 24 is a block diagram of the base station of FIG. 1 according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for providing efficient and reliable communication for wireless devices, e.g., Machine Type Communication (MTC) devices, in a cellular communications network. In this regard, FIG. 1 illustrates a cellular communications network 10 according to one embodiment of the present disclosure. The cellular communications network 10 may be any type of cellular communications network such as, but not limited to, a $3^{rd}$ Generation Partnership Project (3GPP) Long Term Evolution (LTE) or LTE-Advanced cellular communications network. Further, while LTE or LTE-Advanced terminology may sometimes be used throughout this disclosure, the concepts described herein are not limited to LTE or LTE-Advanced. Rather, the concepts disclosed herein are applicable to any suitable type of cellular communications network and more generally to any suitable type of wireless network.

As illustrated, a base station 12 serves a corresponding cell 14 of the cellular communications network 10. Note that while only one base station 12 and one cell 14 are illustrated for clarity and ease of discussion, the cellular communications network 10 typically includes many base stations 12 each of which serves one or more cells, or sectors. An MTC device 16 is located in the cell 14. In this particular example, the MTC device 16 is more specifically located in a coverage hole 18 within the cell 14. For example, the MTC device 16 may be located indoors or in a basement of a building where radio propagation parameters are such that maintaining reliable and efficient communication with the base station 12 is difficult, if not impossible. However, it is not necessary that the MTC device 16 be located in a coverage hole. Note that while only one MTC device 16 is illustrated for clarity and ease of discussion, there may be any number of MTC devices 16, and potentially a large number of MTC devices 16, located in the cell 14. It should also be noted that while many of the embodiments herein focus on the MTC device 16, the embodiments disclosed herein are applicable to other types of wireless devices as well.

In addition to the MTC device 16, a number of wireless devices 20-1 through 20-5 are located in the cell 14. The wireless devices 20-1 through 20-5 are generally referred to herein collectively as wireless devices 20 and individually as wireless device 20. The wireless devices 20 may include additional MTC devices and/or conventional wireless devices, e.g., smart phones, tablet computers equipped with cellular communications interfaces, or the like, which are sometimes referred to as User Equipment devices (UEs) or terminals.

As discussed below, some of the wireless devices 20 are identified as candidate device-anchor base stations. In this particular example, the wireless devices 20-1, 20-2, and 20-3 are identified as candidate device-anchor base stations and, as such, are also referred to herein as candidate device-anchor base stations 20-1, 20-2, and 20-3. One or more of the candidate device-anchor base stations 20-1, 20-2, and 20-3 are selected to serve as a device-anchor base station(s) for the MTC device 16 to provide communication assistance to the MTC device 16 when, e.g., the MTC device 16 is located in the coverage hole 18. The candidate device-anchor base station(s) 20-1, 20-2, and 20-3 may additionally or alternatively be used to provide assistance to the MTC device 16 or the other wireless devices 20 when a network load for the cell 14 is greater than a predefined threshold. In this example, the wireless device 20-1 is selected as the device-anchor base station for the MTC device 16 and, as such, the MTC device 16-1 is also referred to herein as the device-anchor base station 20-1 of the MTC device 16. Thereafter, communication (uplink and/or downlink) between the base station 12 and the MTC device 16 is, partially or completely, via the device-anchor base station 20-1 of the MTC device 16.

As discussed below, when the MTC device 16 is located in the coverage hole 18, communications to and/or from the MTC device 16 are relayed or repeated by the device-anchor base station 20-1. By proper selection of the device-anchor base station 20-1, reliable and efficient communication can be maintained between the MTC device 16 and the base station 12 even when the MTC device 16 is located in the coverage hole 18. Similarly, when high network load conditions exist in the cell 14, the device-anchor base station 20-1 may help alleviate or avoid the high load condition (whether or not the MTC device 16 is located in the coverage hole 18). For example, the device-anchor base station 20-1 of the MTC device 16 may receive a transmission from the MTC device 16, put the transmission on hold, and transmit the transmission to the base station 12 in another time slot when the network load has dropped to an acceptable level. This approach may be acceptable for the MTC device 16, which for most applications has a low latency requirement (i.e., traffic from the MTC device 16 is delay insensitive). As another example, without the device-anchor base station 20-1, the link between MTC device 16 and the base station 12 could be bad and therefore require a low modulation and coding scheme. The low modulation and coding scheme would require more radio resources for transmission. However, with the assistance of the device-anchor base station 20-1, the link quality can be good such that a high modulation and coding scheme can be used, which in turn reduces the amount of radio resources needed for transmission and, as a result, mitigates the high load condition in the cell 14.

Before proceeding, it should be noted that, as used herein, a "node" of the cellular communications network 10 is a wireless device or a network node of the cellular communications network 10. As used herein, a network node is either a radio access network node or a core network node. Further, as used herein, a radio access network node is a node in a radio access network of the cellular communications network (e.g., a base station, a relay, or the like), whereas a core network node is a node in a core network (not shown) of the cellular communications network 10 (e.g., a serving gateway, a mobility management entity, or the like).

Further, an MTC device, such as the MTC device 16, is a wireless device that performs MTC or Machine-to-Machine (M2M) communication. Some examples of an MTC device are smart meters, signboards, cameras, remote sensors, laptops, and appliances that are connected to the cellular communications network. Note that MTC devices are also sometimes referred to as sensors (e.g., a temperature sensor). Typically, an MTC device has reduced latency requirements as compared to other types of wireless devices and has low mobility (e.g., is static). Lastly, a device-anchor base station is a wireless device (e.g., an MTC device or wireless device) that operates as a relay or repeater for data transmissions between another wireless device (e.g., an MTC device) and a base station of a cellular communications network. A device-anchor base station may additionally include limited base station functionality such as, for example, decoding/encoding, demodulation/modulation, and/or signal amplifying as well as other limited base station functionality, as discussed below.

Before proceeding, it should be noted that many of the embodiments described herein use the MTC device 16 as an example (i.e., a device-anchor base station is selected for the MTC device 16). However, the embodiments disclosed herein are not limited to the MTC device 16. Rather, the embodiments described herein may be utilized to select and use a device-anchor base station for any wireless device in need of assistance due to, for example, being located in a coverage hole or high cell load conditions.

Figure 2:
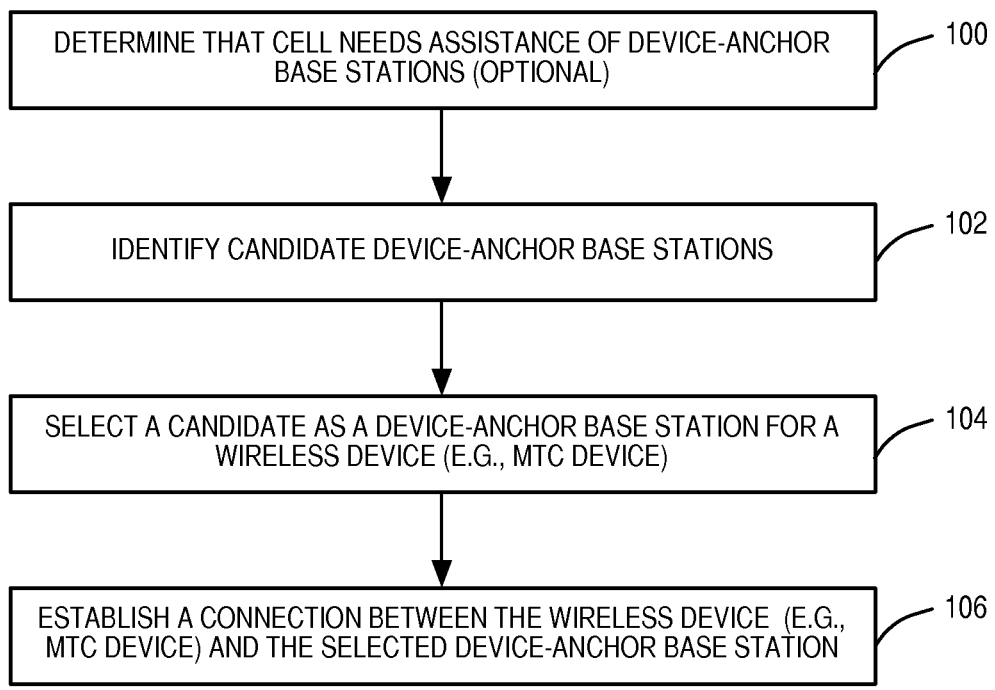
FIG. 2 illustrates a process for utilizing a device-anchor base station to assist with communications between an MTC device and a serving base station of the MTC device according to one embodiment of the present disclosure.

FIG. 2 illustrates the operation of the cellular communications network 10 of FIG. 1 according to one embodiment of the present disclosure. This process may be performed by a network node, e.g., the base station 12, or performed by a combination of a network node and a wireless device, e.g., the MTC device 16, for which a device-anchor base station is selected. Note that, unless explicitly or implicitly required, steps in the various processes described in this disclosure can be performed in any desired order. First, a determination is made that the cell 14 needs assistance of device-anchor base stations (step 100). As discussed below, in one embodiment, a determination is made that the assistance of device-anchor base stations is needed if one or more coverage holes, e.g., the coverage hole 18, are detected in the cell 14. In another embodiment, a determination that the assistance of device-anchor base stations is needed if a network load for the cell 14 is greater than a predefined threshold that is representative of a high network load condition. In yet another embodiment, a determination is made that assistance of device-anchor base stations is needed if one or more coverage holes are detected in the cell 14 and/or there is a high network load condition for the cell 14. Note that step 100 is optional. For example, in another embodiment, device-anchor base station assistance is always active.

In addition to, and in some embodiments in response to, determining that assistance is needed, a number of candidate device-anchor base stations are identified (step 102). Again, continuing the example illustrated in FIG. 1, the wireless devices 20-1, 20-2, and 20-3 are identified as candidate device-anchor base stations. As discussed below in detail, the candidate device-anchor base stations may be selected from a larger group (and possibly all) of the wireless devices 20 in the cell 14 based on one or more predefined criteria. The predefined criteria may include, for example, one or more of the following: a criterion that a wireless device 20 must be capable of transmitting in both the uplink and downlink directions in order to be selected as a candidate device-anchor base station, one or more energy profile based criteria, one or more traffic profile based criteria, one or more mobility based criteria, etc.

Once the candidate device-anchor base stations have been identified and it is known that a wireless device, which in this example is the MTC device 16, needs assistance, a candidate device-anchor base station is selected as the device-anchor base station 20-1 of the MTC device 16 (step 104). The device-anchor base station 20-1 may be selected from the candidate device-anchor base stations 20-1, 20-2, and 20-3 using any suitable criteria. Once the device-anchor base station 20-1 for the MTC device 16 is selected, a connection is established between the MTC device 16 and the device-anchor base station 20-1 such that communication between the MTC device 16 and the base station 12 can be conducted via the device-anchor base station 20-1 (step 106). The connection may be established using, for example, techniques similar to ones used for Radio Resource Control (RRC) connection. The connection may be established, in some embodiments, such that the MTC device 16 is unaware as to whether the connection to the base station 12 includes 0, 1, or N hops. As discussed below, in some embodiments, steps 100 and 102 may be performed by the cellular communications network 10 (e.g., by a network node such as the base station 12), whereas steps 104 and 106 may be performed either by the cellular communications network 10 (e.g., by a network node such as the base station 12) or by the MTC device 16.

Regarding the operation of the wireless device 20-1 as a device-anchor base station, some operations that are normally provided by a base station may not be supported by the device-anchor base station 20-1 since, e.g., those operations may not be needed. For example, if the device-anchor base station 20-1 and the MTC device 16 are both static, then the device-anchor base station 20-1 may not support mobility functions such as handover. In addition, these devices might operate in a new air interface, which might be similar to the radio interface used within cellular networks (e.g., "degraded $5^{th}$ Generation (5G) radio interface"). As an example, this specific tailored version of the 5G radio interface may support only a given number of modulation and coding schemes, or only a given number of cyclic prefix sizes, etc. It is mentioned here that, if the device-anchor base station 20-1 is a static device, the direct communication between the device-anchor base station 20-1 and the base station 12 is between static devices. If the MTC device 16 is also static, the MTC device 16 might be requested to transmit mobility measurements with lower frequency, or even not to perform measurements. The Channel Quality Indication (CQI) reporting can also be minimized if the device-anchor base station 20-1 communicates with other wireless devices (e.g., the MTC device 16) supporting only one type of modulation, e.g. Quadrature Phase Shift Keying (QPSK) and coding, e.g. turbo 1/3. In some embodiments, link adaptation may not be performed. For instance, link adaptation may be not needed in a situation where the device-anchor base station 20-1 and the MTC device 16 always transmit with the maximum possible power level. All this information has to go to the normal base station which is in control of the connection. The same applies for the power control. Relaxed Hybrid Automatic Repeat Request (HARQ) operation could also be utilized.

In a further embodiment, the device-anchor base station that is selected is one which can be selected so as to broadcast or push data to a number of sensors. This device-anchor base station may also be one which is selected so as to push data related to updating sensors or to transmit information to be consumed/read by sensors. This is often a problem in networks supporting MTC communication. Access network nodes can appoint a device-anchor base station to diffuse the information.

Figure 3A:
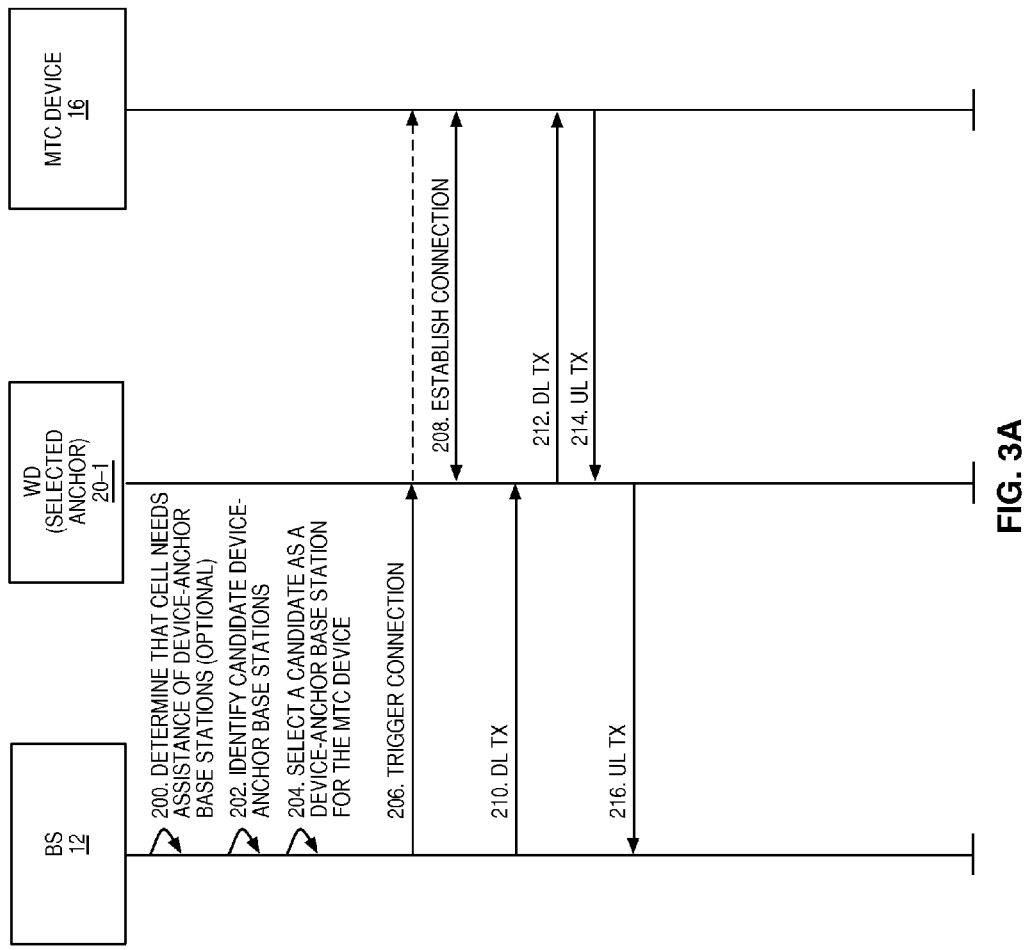
FIGS. 3A and 3B illustrate the operation of the cellular communications network of FIG. 1 according to the process of FIG. 2 according to one embodiment of the present disclosure.
Figure 3B:
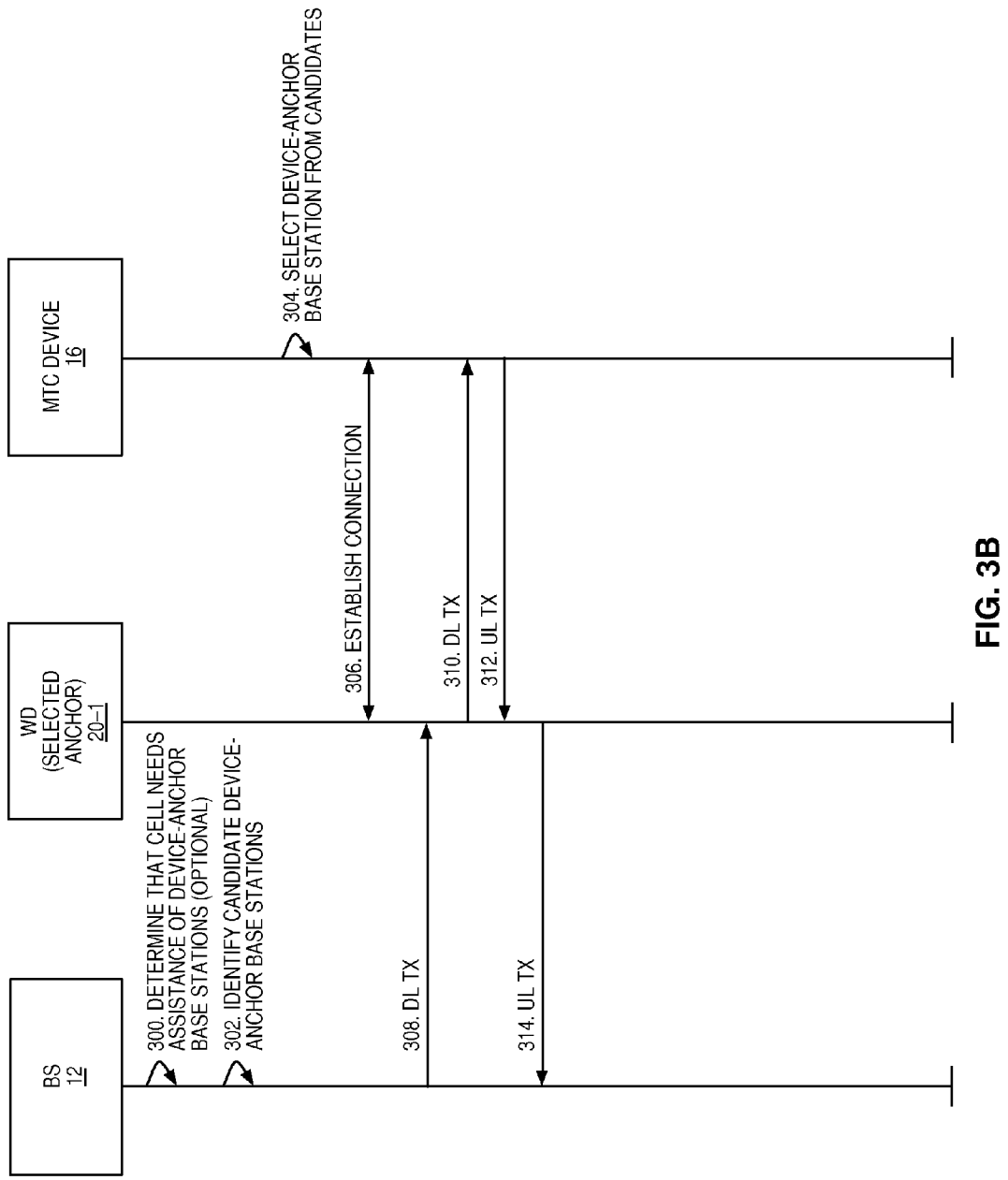

FIGS. 3A and 3B illustrate the operation of the cellular communications network 10 of FIG. 1 according to the process of FIG. 2 according to two different embodiments of the present disclosure. Again, in these embodiments, the wireless device for which the device-anchor base station is selected is the MTC device 16. However, the MTC device 16 is just one example. In the same manner, a device-anchor base station may be selected for other wireless devices. In FIG. 3A, the selection of the device-anchor base station 20-1 is performed at the base station 12, whereas in FIG. 3B the selection of the device-anchor base station 20-1 is performed at the MTC device 16.

More specifically, in the embodiment of FIG. 3A, the base station 12 determines that assistance of device-anchor base stations is needed in the cell 14 (step 200). As discussed above with respect to step 100 of FIG. 2, step 200 may not be performed in some embodiments. The base station 12 also identifies candidate device-anchor base stations (step 202). At some point, when the MTC device 16 is in need of assistance, the base station 12 selects a candidate device-anchor base station from those identified in step 202 as the device-anchor base station 20-1 for the MTC device 16 (step 204).

In this embodiment, the base station 12 triggers establishment of a connection between the device-anchor base station 20-1 and the MTC device 16 (step 206). In one embodiment, the base station 12 instructs or otherwise enables the device-anchor base station 20-1 to establish a connection with the MTC device 16. In another embodiment, the base station 12 instructs or otherwise enables the MTC device 16 to establish a connection with the device-anchor base station 20-1. The MTC device 16 and the device-anchor base station 20-1 then communicate to establish a connection (step 208). Note that, in another embodiment, the base station 12 establishes the connection such that the device-anchor base station 20-1 is transparent to the MTC device 16 (i.e., the device-anchor base station 20-1 is unknown to the MTC device 16 such that, to the MTC device 16, it appears as though communications are sent/received directly to/from the base station 12). At that point, communication between the base station 12 and the MTC device 16 is provided, at least partially, via the device-anchor base station 20-1. For example, a downlink transmission from the base station 12 is relayed or repeated from the device-anchor base station 20-1 to the MTC device 16 (steps 210 and 212). Likewise, an uplink transmission from the MTC device 16 is relayed or repeated from the device-anchor base station 20-1 to the base station 12 (steps 214 and 216). The transmission of the uplink transmission from the device-anchor base station 20-1 to the base station 12 can use the same or different radio (i.e., time and/or frequency) resources as the uplink transmission from the MTC device 16.

The embodiment of FIG. 3B is substantially the same as that of FIG. 3A but where the selection of the device-anchor base station 20-1 is performed by the MTC device 16. More specifically, in the embodiment of FIG. 3B, the base station 12 determines that assistance of device-anchor base stations is needed in the cell 14 (step 300). As discussed above with respect to step 100 of FIG. 2, step 300 may not be performed in some embodiments. The base station 12 also identifies candidate device-anchor base stations (step 302). At some point, when the MTC device 16 is in need of assistance, the MTC device 16 selects a candidate device-anchor base station from those identified in step 302 as the device-anchor base station 20-1 for the MTC device 16 (step 304).

In this embodiment, the MTC device 16 and the device-anchor base station 20-1 then communicate to establish a connection (step 306). At that point, communication between the base station 12 and the MTC device 16 is provided, at least partially, via the device-anchor base station 20-1. For example, a downlink transmission from the base station 12 is relayed or repeated from the device-anchor base station 20-1 to the MTC device 16 (steps 308 and 310). Likewise, an uplink transmission from the MTC device 16 is relayed or repeated from the device-anchor base station 20-1 to the base station 12 (steps 312 and 314).

Figure 4:
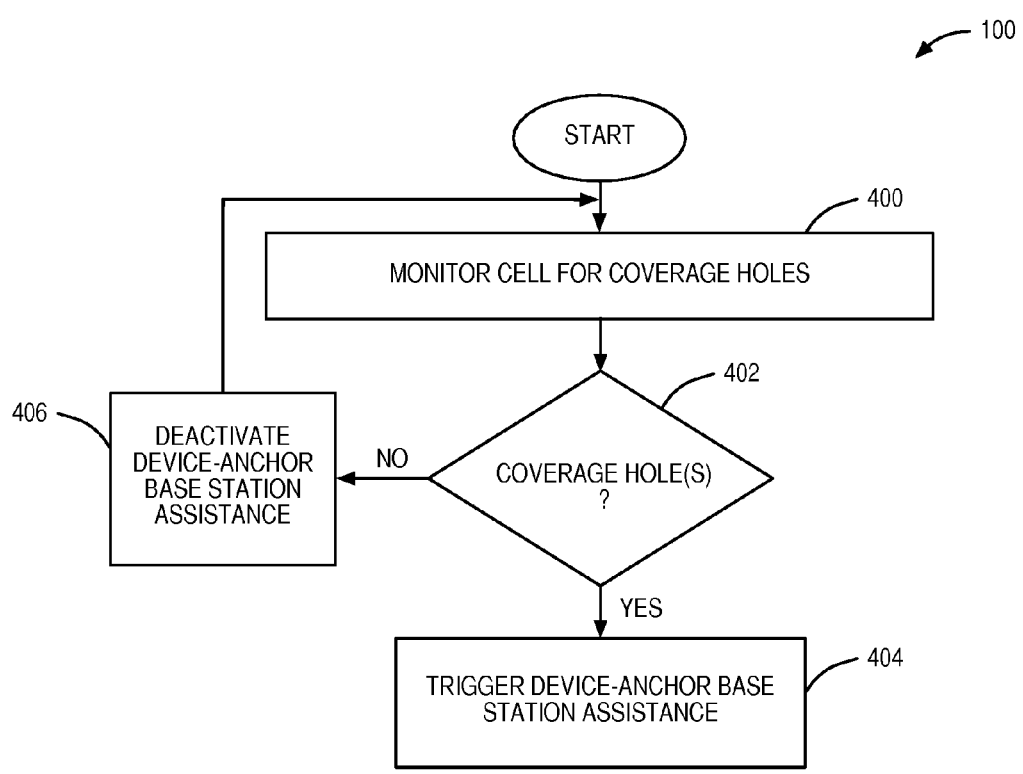
FIG. 4 illustrates a process for determining whether to activate, or trigger, device-anchor base station assistance based on coverage holes according to one embodiment of the present disclosure.

Now, the discussion turns to various embodiments of the individual steps described above with respect to FIG. 2 and FIGS. 3A and 3B. In this regard, FIG. 4 illustrates a process for determining whether assistance of device-anchor base stations is needed for the cell 14 according to one embodiment. This process may be used in step 100 of FIG. 2, or likewise in step 200 or step 300 of FIG. 3A or 3B, respectively. As illustrated, the cell 14 is monitored for coverage holes such as, for example, the coverage hole 18 (step 400). A coverage hole is an area within the cell 14 in which a Signal-to-Interference plus Noise Ratio (SINR) or Radio Frequency (RF) signal level falls below a predetermined threshold. For example, in one embodiment, a coverage hole is an area in which a received signal level (power or quality level) at both the receiver of the base station 12 and the receiver of a wireless device 20 (or MTC device 16) falls below a noise sensitivity level for all or at least some channels. Coverage holes are usually caused by physical obstructions such as, for example, buildings, foliage, hills, tunnels, indoor parking garages, or the like. Such physical obstructions are quite common for MTC devices used for M2M communication as well as in less than ideal network deployments.

Monitoring of the cell 14 for coverage holes may be performed by a network node (e.g., the base station 12), the wireless devices 20 (and/or the MTC device 16), or a combination thereof. Note, however, that step 400 may not be performed in some embodiments. For example, in one embodiment, one or more coverage holes in the cell 14 are predetermined and known to the cellular communications network 10 via, for example, driving tests. However, coverage holes may be detected in any suitable manner. Some non-limiting examples will now be given. In one embodiment, a coverage hole may be detected by a wireless device 20 located in the coverage hole. For instance, a wireless device 20 may detect the coverage hole when the coverage hole is only a partial coverage hole (i.e., a coverage hole for some but less than all channels). As one example, consider a typical scenario with a robust random access procedure implementation and a less robust Physical Uplink Shared Channel (PUSCH) implementation. In this scenario, a wireless device 20 may successfully perform a random access to connect to the base station 12, but the wireless device 20 is not able to successfully transmit PUSCH. In this case, after a predefined number of consecutive failed PUSCH transmissions, a determination can be made that the wireless device 20 is located in a coverage hole or, more specifically, a partial coverage hole. The position of the wireless device 20 can then be recorded as a coverage hole. Notably, the position of the wireless device 20 can be estimated or otherwise obtained using any suitable technique, e.g., by combining previous position information as well as signal strength information of the wireless device 20. The position of the wireless device 20 can also be obtained with the assistance of other static wireless devices that are not located in a coverage hole.

In another embodiment, coverage holes are detected at the network level (e.g., by the base station 12) based on reports from wireless devices (e.g., the wireless devices 20 and the MTC device 16) performing Radio Link Failure (RLF) recovery. During RLF recovery, wireless devices transmit an RCConnection Reestablishment Request message containing a logMeasAvailable-rel10 Information Element (IE), which contains the last measurements done by the wireless device prior to RLF. This message also contains a cell identity of the last serving cell of the wireless device reporting the RLF and positioning information, which identifies the position of the wireless device when the RLF occurred. This information can be used by the network (e.g., the base station 12) to detect coverage holes, including the positions of the coverage holes.

In another embodiment, the base station 12 (i.e., the serving base station) and/or the wireless devices 16, 20 served by the base station 12 can detect coverage holes (e.g., the coverage hole 18) in real time based on, for example, received power, SINR or HARQ NACK rate, etc., or any combination thereof. For example, the coverage hole 18 may be detected by the base station 12 when the received SINR from the MTC device 16 falls below a predetermined level, e.g. 0 Decibels (dB). Position information for the MTC device 16 at the time of detecting the coverage hole 18 can be used to define the position of the coverage hole 18. The position information (i.e., information indicative of the position) of the MTC device 16 (or other wireless device 20) may be obtained using any suitable technique. For example, if the MTC device 16 is a mobile device, the position information may be position information obtained from or reported by the MTC device 16 prior to entering the coverage hole 18. The position information may alternatively be an estimate of the position of the MTC device 16 obtained using signal strength and Direction of Arrival (DOA) techniques. As another example, the position of the MTC device 16 can be determined with help from other static wireless devices 20 that are not located in any coverage hole.

In another embodiment, again using the MTC device 16 and the coverage hole 18 as an example, the coverage hole 18 may be detected based on a mode of operation of the MTC device 16. More specifically, the coverage hole 18 may be detected when the MTC device 16 operates in a coverage enhancement mode of operation. As used herein, the coverage enhancement mode of operation is a mode of operation in which one or more coverage enhancement techniques are utilized to enable communication between the MTC device 16 and the base station 12. Examples of such coverage enhancement techniques include, but are not limited to, extended Transmission Time Interval (TTI) bundling, transmission repetition, use of higher pilot density, use of specific radio (i.e., time and/or frequency) resources reserved for the coverage enhancement mode, etc. More specifically, the base station 12 may determine that the MTC device 16 is in a coverage hole (i.e., the coverage hole 18) when the base station 12 becomes aware that the MTC device 16 is operating in the coverage enhancement mode. The base station 12 may become aware that the MTC device 16 is operating in the coverage enhancement mode using any suitable technique, e.g., reporting by the MTC device 16, detection by the base station 12, or the like.

While monitoring the cell 14 for coverage holes, the base station 12 determines whether any coverage holes have been detected (step 402). If so, the base station 12 triggers, or activates, device-anchor base station assistance (step 404). For example, the base station 12 may then detect or otherwise determine candidate device-anchor base stations, determine when wireless devices (e.g., the MTC device 16) needs assistance, and then effect selection of device-anchor base station(s) from the candidates for any wireless device(s) in need of assistance. In other words, the base station 12 then continues with the process of FIG. 2 or FIGS. 3A and 3B. If no coverage holes are detected, the base station 12 may, in some embodiments, deactivate device-anchor base station assistance (step 406). For example, the base station 12 may no longer look for wireless devices in need of assistance. The process then returns to step 400 and is repeated.

Figure 5:
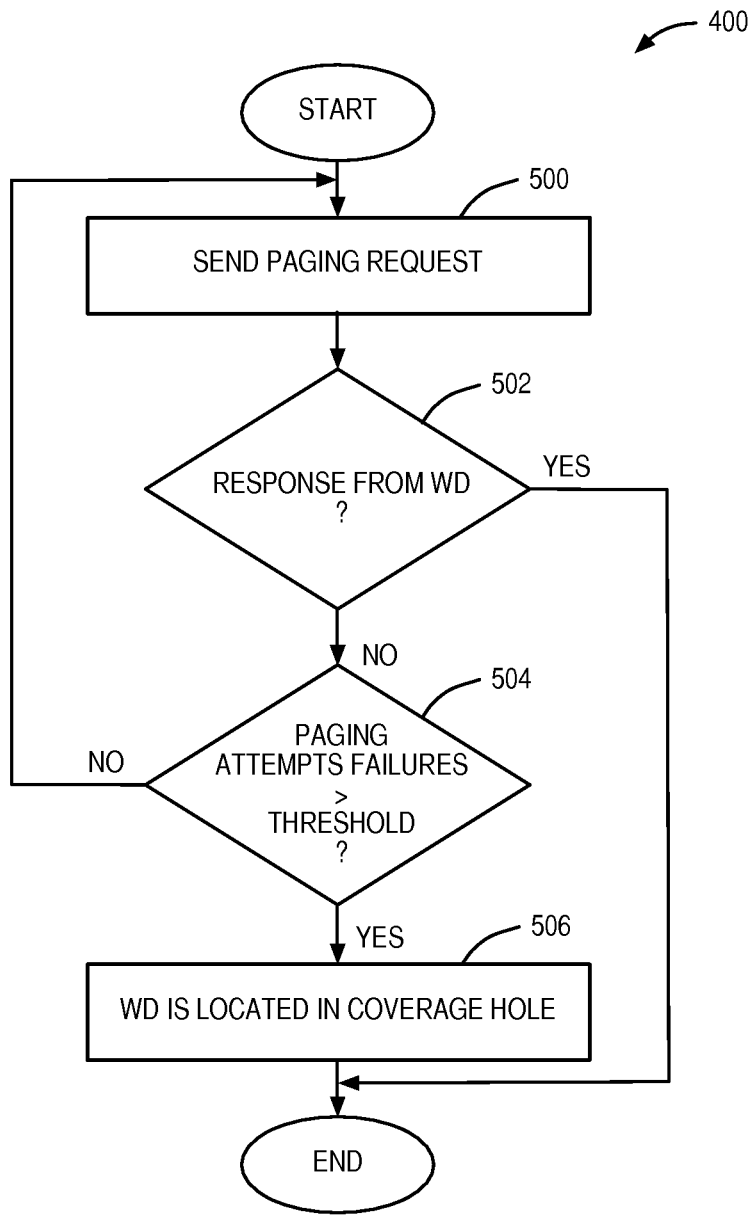
FIG. 5 illustrates a process for detecting a coverage hole according to one embodiment of the present disclosure.

In another embodiment, the base station 12 (or other radio access network node) may detect a coverage hole (e.g., the coverage hole 18) in response to unsuccessful communication attempts with a wireless device. In this regard, FIG. 5 is a flow chart that illustrates the operation of a radio access network node to detect a coverage hole according to one embodiment of the present disclosure. Again, in this example, the process is described using the base station 12, the MTC device 16, and the coverage hole 18. However, this process may be used by any radio access network node to detect a coverage hole within its corresponding coverage area, or cell. First, the base station 12 sends a paging request to the MTC device 16 (step 500). The base station 12 determines whether a response to the paging request has been received within a preconfigured amount of time (step 502). If so, the process ends. If not, the base station 12 determines whether a number of consecutive paging attempt failures for the MTC device 16 is greater than a predefined threshold (step 504). If not, the process returns to step 500 and is repeated.

Once the number of consecutive paging attempt failures for the MTC device 16 is greater than the predefined threshold, the base station 12 determines that the MTC device 16 is located in a coverage hole (step 506). In other words, in this example, the base station 12 detects the coverage hole 18 in response to the number of consecutive paging request failures for the MTC device 16 exceeding the predefined threshold. Further, if known, the position of the MTC device 16 can be used by the base station 12 to define the position of the coverage hole 18 within the cell 14.

Figure 6:
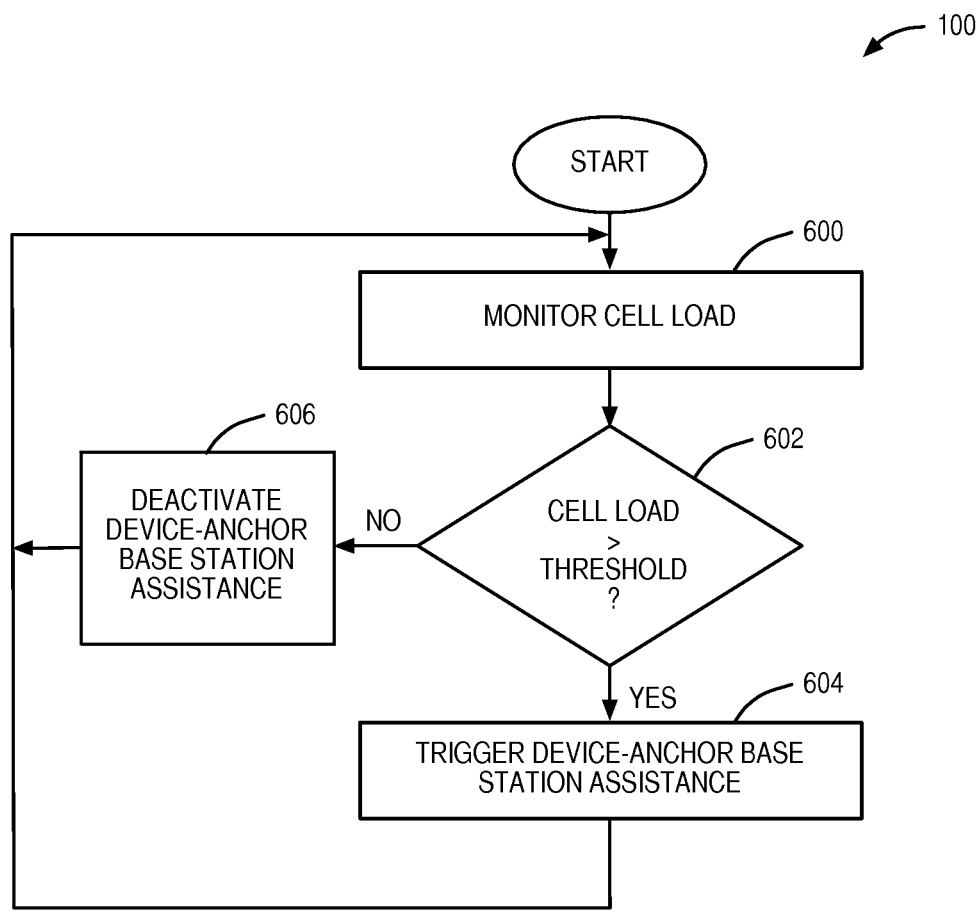
FIG. 6 illustrates a process for determining whether to activate, or trigger, device-anchor base station assistance based on network load according to another embodiment of the present disclosure.

The discussion above with respect to FIGS. 4 and 5 describes embodiments in which a determination is made that there is a need for the assistance of device-anchor base stations is made in response to detecting coverage hole(s) within the cell 14. In another embodiment, a determination is made that there is a need for assistance of device-anchor base stations in response to detecting a high load condition in the cell 14. In this regard, FIG. 6 is a flow chart that illustrates the operation of the base station 12 to trigger device-anchor base station assistance when the cell 14 is under a high load condition according to one embodiment of the present disclosure. This process may be used in step 100 of FIG. 2, or likewise in step 200 or step 300 of FIG. 3A or 3B, respectively.

As illustrated, the base station 12 monitors the cell load of the cell 14 (step 600). The cell load may be defined by an amount of requested resources, a number of wireless devices connected to the cell 14, a percentage or amount of unused radio resources of the cell 14 (e.g., percentage or amount of unused resource blocks), a percentage or amount of used radio resources of the cell 14 (e.g., percentage or amount of used resource blocks), or the like. In some communications networks, for example LTE or High Speed Packet Access (HSPA) networks, there may be counters implemented on the network side (e.g., by the base station 12) to monitor the cell load based on, for example, the percentage of scheduled resource blocks.

The base station 12 then determines whether the cell load is greater than a predefined threshold that represents a high load condition (step 602). If so, the base station 12 triggers, or activates, device-anchor base station assistance (step 604). For example, the base station 12 may then detect or otherwise determine candidate device-anchor base stations, determine when wireless devices (e.g., the MTC device 16) need assistance, and then effect selection of device-anchor base station(s) from the candidates for any wireless device(s) in need of assistance. In other words, the base station 12 continues with the process of FIG. 2 or FIGS. 3A and 3B. If a high load condition is not detected, the base station 12 may, in some embodiments, deactivate device-anchor base station assistance (step 606). For example, the base station 12 may no longer look for wireless devices in need of assistance. The process then returns to step 600 and is repeated.

Figure 7:
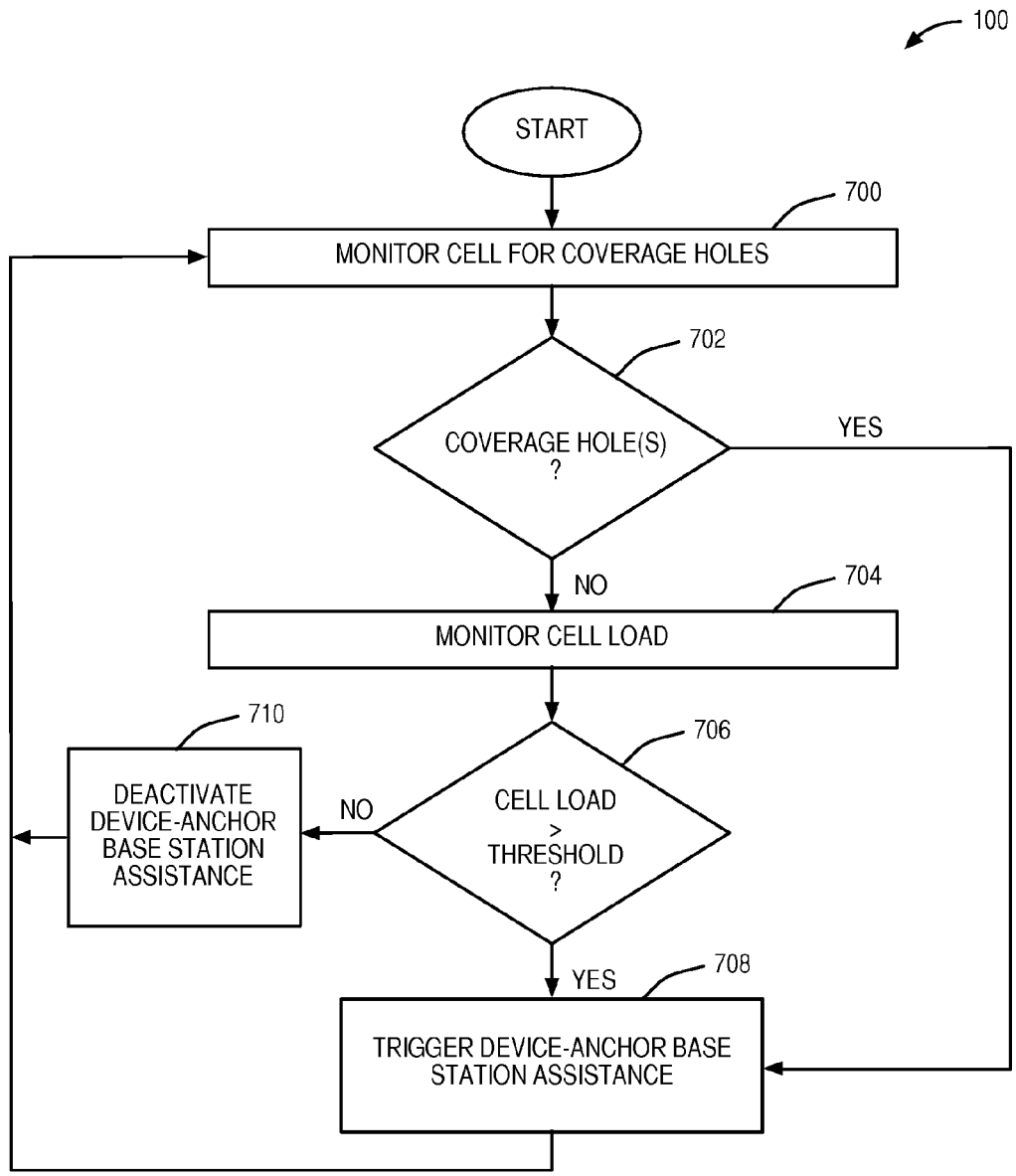
FIG. 7 illustrates a process for determining whether to activate, or trigger, device-anchor base station assistance based on coverage holes and network load according to one embodiment of the present disclosure.

FIG. 7 illustrates another embodiment in which both the detection of coverage holes and high cell load conditions trigger device-anchor base station assistance according to another embodiment of the present disclosure. This process may be used in step 100 of FIG. 2, or likewise in step 200 or step 300 of FIG. 3A or 3B, respectively. In this embodiment, the base station 12 monitors the cell 14 for coverage holes and determines whether any coverage holes have been detected, as described above (steps 700 and 702). If any coverage holes are detected, proceeds to step 708, which is discussed below. If no coverage holes are detected, the base station 12 monitors the cell load of the cell 14 and determines whether the cell load is greater than the predefined threshold, as discussed above (steps 704 and 706). Note that while steps 700-706 are illustrated as being performed sequentially, some of the steps 700-706 may be performed in parallel (e.g., the base station 12 may monitor the cell for coverage holes while also monitoring the cell load). If the cell load is greater than the predefined threshold or if there are any coverage holes in the cell 14, the base station 12 triggers, or activates, device-anchor base station assistance (step 708). Otherwise, the base station 12 may, in some embodiments, deactivate device-anchor base station assistance (step 710). The process then returns to step 700 and is repeated.

Figure 8:
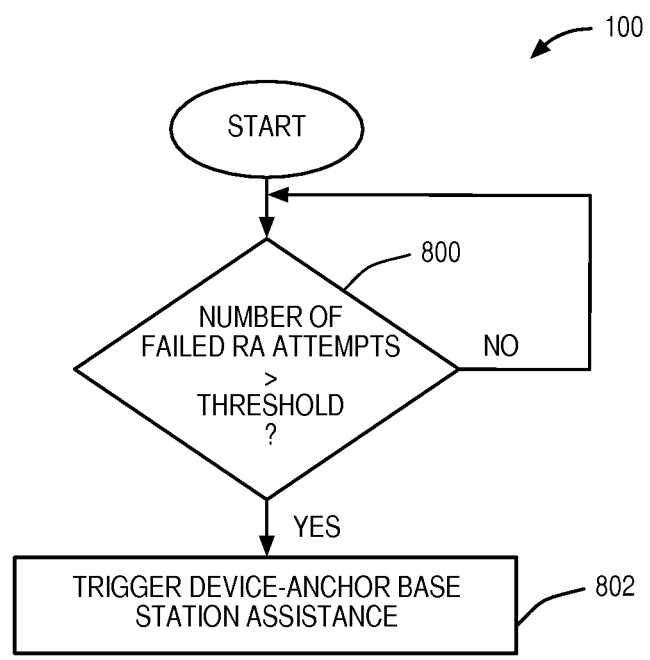
FIG. 8 illustrates a process for determining whether to activate, or trigger, device-anchor base station assistance based on failed random access attempts according to yet another embodiment of the present disclosure.

In another embodiment, a determination is made that there is a need for assistance of device-anchor base stations in response to failed Random Access (RA) attempts. In this regard, FIG. 8 is a flow chart that illustrates the operation of the base station 12 to trigger device-anchor base station assistance when the cell 14 is under a high load condition according to one embodiment of the present disclosure. While the base station 12 and the MTC device 16 are again used as an example, this process is not limited thereto and, therefore, can be performed by other network nodes with respect to RA attempts for other wireless devices. This process may be used in step 100 of FIG. 2, or likewise in step 200 or step 300 of FIG. 3A or 3B, respectively.

As illustrated, the base station 12 determines whether a number of consecutive failed RA attempts by the MTC device 16 is greater than a predefined threshold for device-anchor base station assistance (step 800). The failed RA attempts may be for the cell 14 and/or failed RA attempts for the MTC device 16 regardless of which cell(s) the MTC device 16 was attempting to access. If not, the process returns to step 800. If the number of failed RA attempts exceeds the predefined threshold, the base station 12 triggers, or activates, device-anchor base station assistance, as discussed above (step 802).

Figure 9:
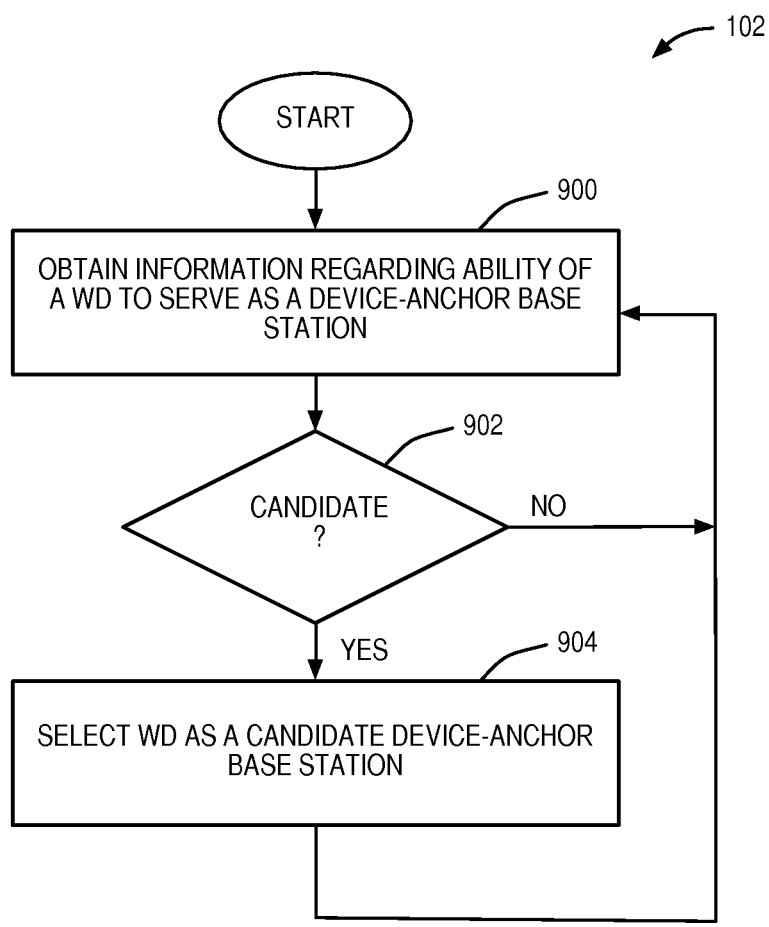
FIG. 9 illustrates a process for selecting a candidate device-anchor base station according to one embodiment of the present disclosure.

While FIGS. 4-8 have focused on embodiments for determining whether device-anchor base station assistance is needed, FIGS. 9-12 relate to embodiments for identifying candidate device-anchor base stations as described above with respect to step 102 of FIG. 2 and likewise steps 202 and 302 of FIGS. 3A and 3B. More specifically, FIG. 9 is a flow chart that illustrates a process for identifying candidate device-anchor base stations according to one embodiment of the present disclosure. This process may be performed by a network node, a radio access network node (e.g., the base station 12), or the wireless devices 20. As illustrated, first, information regarding the ability of the wireless device 20 to serve as a device-anchor base station is obtained (step 900). As discussed below, this information can include any information needed to determine whether the wireless device 20 satisfies one or more predefined criteria for being a device-anchor base station. Further, the information may be obtained in any suitable manner. For example, if the process is performed by a radio access node (e.g., the base station 12), the radio access node may obtain some or all of the information from the wireless device 20 via, for example, RRC signaling, one or more information elements included in a new or existing message, or the like. The radio access node may additionally or alternatively obtain some or all of the information from other network nodes.

Next, a decision is made as to whether the wireless device 20 should be selected as a candidate device-anchor base station based on one or more predefined criteria for being a device-anchor base station and the information regarding the ability of the wireless device 20 to serve as a device-anchor base station (step 902). If so, the wireless device 20 is selected as a candidate device-anchor base station (step 904). Otherwise, in this example, the process returns to step 900 and is repeated for another wireless device 20.

In one embodiment, the one or more predefined criteria for serving as a device-anchor base station utilized to select candidate device-anchor base stations include one or more the following criteria. As a first example, the one or more predefined criteria may include a criterion that the wireless device 20 under consideration has an ability to communicate in both senses, namely, uplink and downlink. More specifically, the criterion may be the ability of the wireless device 20 to transmit its own uplink, receive an uplink from wireless device(s) (e.g., the MTC device 16) attached to the wireless device 20 as a device-anchor base station, receive own its own downlink, and transmit a downlink to wireless device(s) (e.g., the MTC device 16) attached to the wireless device 20 as a device-anchor base station. In Time Division Duplexing (TDD) systems, this is straightforward because uplinks and downlinks share the same frequency band. However, in Frequency Division Duplexing (FDD) systems, this is not typically possible for normal wireless devices. In particular, a wireless device may not be able to both transmit and receive on the uplink frequency band and both transmit and receive on the downlink frequency band. For this criterion, the information regarding the ability of the wireless device 20 to serve as a device-anchor base station includes information that is indicative of the ability of the wireless device 20 to both transmit and receive using downlink resources (e.g., a downlink frequency band in a FDD system) and the ability of the wireless device 20 to both transmit and receive using uplink resources (e.g., an uplink frequency band in an FDD system). This information may be obtained from, for example, the wireless device 20.

As a second example, the one or more predefined criteria may include a criterion that the wireless device 20 has accessibility to an energy, or power, source. For example, the criterion may be that the wireless device 20 be connected to a permanent power source rather than a temporary power source (i.e., a battery). For this criterion, the information regarding the ability of the wireless device 20 to serve as a device-anchor base station includes an energy profile of the wireless device 20. In one embodiment, the energy profile indicates a type of power source available to the wireless device 20, e.g., a permanent power source such as a power supply or a temporary power supply such as a battery. Further, if the power source is a battery, the energy profile may indicate a capacity or level of charge of the battery (e.g., 95% charged or X hours remaining). In this case, the capacity of the battery and/or the level of charge of the battery may be used to determine whether the wireless device 20 should be selected as a candidate device-anchor base station (e.g., select the wireless device 20 as a candidate device-anchor base station if the capacity and/or charge of the battery is greater than a threshold). The energy profile of the wireless device 20 may be obtained from, for example, the wireless device 20.

As a third example, the one or more predefined criteria may include one or more criteria related to a traffic profile of the wireless device 20. As one specific example, the one or more predefined criteria may include a criterion that the wireless device 20 is to be selected as a device-anchor base station if the wireless device transmits/receives signals from the base station 12 periodically, with a well-defined period. Conversely, wireless devices 20 that constantly transmit to and/or receive from the cellular communications network 10 and/or wireless devices 20 that transmit to and/or receive from the cellular communications network 10 with irregular traffic patterns are not to be selected as device-anchor base stations. Moreover, it is easier for a device having a given traffic pattern with defined packet size and period to decide the amount of energy available for assisting/relaying purposes. For traffic profile based criteria, the information regarding the ability of the wireless device 20 to serve as a device-anchor base station includes the traffic profile of the wireless device 20. The traffic profile of the wireless device 20 may be obtained by, for example, monitoring traffic to and/or from the wireless device 20 at the network level (e.g., at the base station 12) or at the wireless device 20.

As a fourth example, the one or more predefined criteria may include one or more criteria related to a mobility pattern of the wireless device 20. The mobility pattern of the wireless device 20 can indicate, for example, that the wireless device 20 is positioned at a fixed location (i.e., is static), both within a short time scale and larger time scale. In one example, the one or more criteria related to the mobility pattern of the wireless device 20 may include a criterion that the wireless device 20 is to be selected as a candidate device-anchor base station if the wireless device 20 is static. Otherwise, if the wireless device 20 is moving, it should not be selected as a candidate device-anchor base station. For mobility pattern based criteria, the information regarding the ability of the wireless device 20 to serve as a device-anchor base station includes the mobility pattern of the wireless device 20. The mobility pattern of the wireless device 20 may be obtained by, for example, monitoring movement of the wireless device 20 at the network level (e.g., at the base station 12) or at the wireless device 20.

As a fifth example, the one or more predefined criteria may include a criterion that the wireless device 20 has an ability to operate as a relay or repeater before being selected as a candidate device-anchor base station. Further, this criterion may be combined with a mobility criterion such that the wireless device 20 may be selected as a candidate if the wireless device 20 has the capability to operate as a relay or repeater and has mobility that is less than a predefined threshold (e.g., static or low mobility). As known, repeaters repeat the signal they receive at the same frequency band. Not all wireless devices 20 have the ability to repeat a received signal on the same frequency band on which the signal was received. Further, in order for a wireless device 20 to operate as a relay, the wireless device 20 must be able to process the received signal up to Radio Link Control (RLC) or Packet Data Convergence Protocol (PDCP) level and forward the received information at the same frequency band as the one at which the signal is received. Not all wireless devices 20 may have this ability either. For this criterion, information regarding the ability of the wireless device 20 to operate as a relay or repeater may be obtained from the wireless device 20 and/or a network node.

As a sixth example, the one or more predefined criteria may include one or more hardware based criteria. For example, the one or more predefined criteria may include a criterion that the wireless device 20 have a certain hardware capacity, e.g., at least a threshold number of transmitter/receiver antennas. For this criterion, information regarding the hardware capabilities of the wireless device 20 to operate as a relay or repeater may be obtained from the wireless device 20 and/or a network node.

As a seventh example, the one or more predefined criteria may include a criterion that the wireless device 20 be located within a threshold proximity from the serving base station 12 of the wireless device 20 in order to be selected as a candidate device-anchor base station. In one example, a Reference Signal Received Power (RSRP) reported by the wireless device 20 to the base station 12 can be used as an indicator of the proximity of the wireless device 20 to the base station 12 in which case the wireless device 20 can be determined to be within the threshold proximity if the reported RSRP is greater than a predefined RSRP threshold since RSRP increases as proximity decreases. Alternatively, measured SINR and received power at the base station 12 could be used an indicators of proximity to the base station 12. As another alternative, a position technique may be used to determine the position of the wireless device 20 relative to the base station 12. The information indicative of the proximity of the wireless device 20 to the base station 12 may, for example, be obtained from the wireless device 20 or a network node.

As an eighth example, the one or more predefined criteria may include a criterion that the wireless device 20 be located within a threshold proximity from one or more wireless devices (e.g., the MTC device 16) in need of assistance in order to be selected as a candidate device-anchor base station. The proximity of the wireless device 20 to the one or more wireless devices in need of assistance can be estimated, e.g., by using pilot signals. If a Received Signal Strength (RSS) at the wireless device 20 from the one or more wireless devices in need of assistance is below a threshold, then the wireless device 20 is not selected as a candidate device-anchor base station, at least for those wireless devices for which the RSS is less than the threshold.

As a final example, the one or more predefined criteria may include a criterion related to a number of wireless devices to be accommodated or that can be accommodated by the wireless device 20 as a device-anchor base station. For example, if the number of wireless devices to be accommodated by the wireless device 20 as a device-anchor base station is less than a predefined threshold, then the wireless device 20 is not selected as a candidate device-anchor base station.

As discussed above, the information regarding the ability of the wireless device 20 to serve as a device-anchor base station can be or include various types of information and can be obtained in any suitable manner. As one example, FIG. 10 illustrates a number of IEs of an RRC message that can be used to communicate at least some of the information regarding the ability of the wireless device 20 to serve as a device-anchor base station from the wireless device 20 to the base station 12 via RRC signaling. In this example, the IEs include a UE Capability Information IE that includes several capabilities of the wireless device 20 including: power supply access (yes/no), maximum output power, packet size, periodicity, start time offset, mobility pattern, ability to operate as a receiver and transmitter in both the uplink and the downlink, and the ability to operate as a relay/repeater. In this example, the UE Capability Information IE is appended to an RRC Connection Request message. As one alternative example, the UE Capability Information IE may additionally or alternatively be appended to a UEinformatinoResponse message, as defined in 3GPP TS 36.331, as a response to a UEInformationRequest message sent to the wireless device 20 from the network (e.g., from the base station 12).

The selection of the wireless device 20 as a candidate device-anchor base station may be done by an appropriate access network node (e.g., the base station 12) upon the wireless device 20 being set up and registered. If the one or more criteria for being a candidate device-anchor base station are fulfilled, the wireless device 20 is selected as a candidate device-anchor base station. In one embodiment, a new wireless device category is defined for the wireless device 20 selected as the device-anchor base station, and a list of the wireless devices 20 belonging to this category as well as the related information, e.g. energy access, traffic profile, mobility pattern, is stored in the network.

Figure 11:
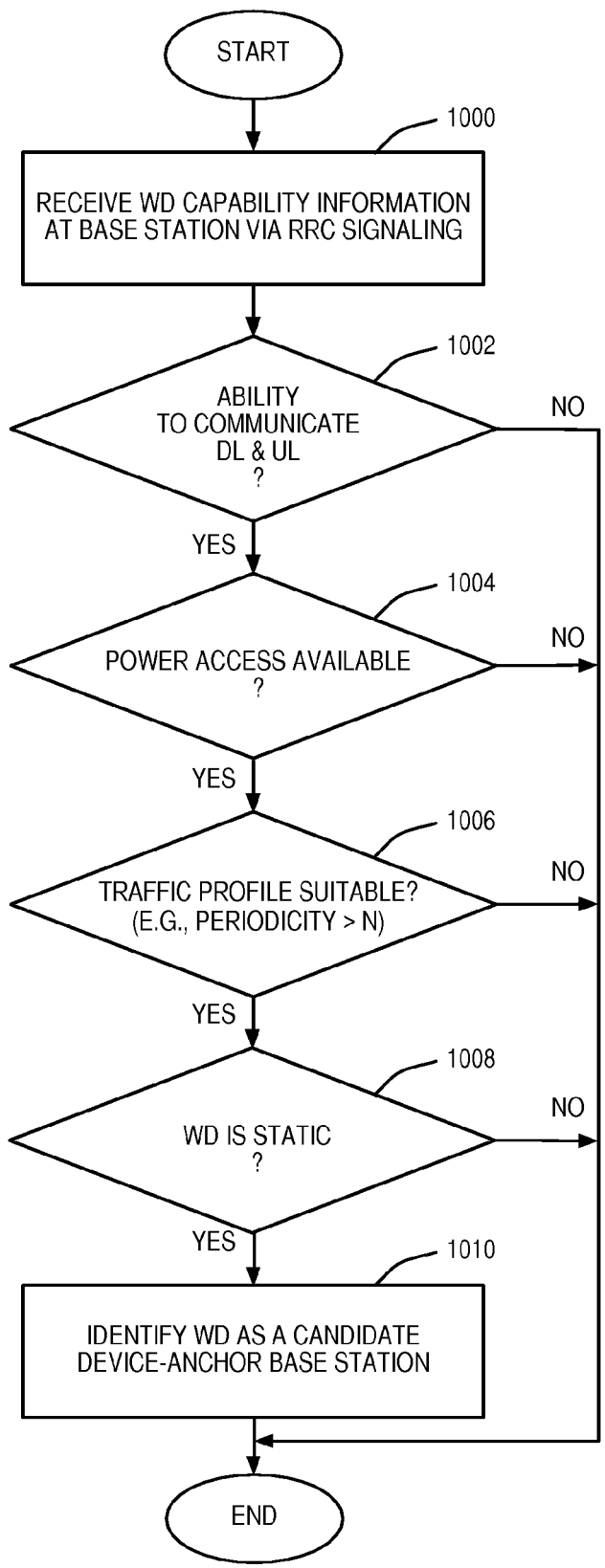
FIG. 11 illustrates a process for selecting a candidate device-anchor base station according to another embodiment of the present disclosure.

FIG. 11 is a flow chart that illustrates a process for identifying candidate device-anchor base stations according to one embodiment of the present disclosure. This process is performed by the base station 12. Further, this process is similar to that of FIG. 9 but where specific examples of the predefined criteria for serving as a candidate device-anchor base station are used. As illustrated, the base station 12 receives the capability information from the wireless device 20 via RRC signaling (step 1000). In this example, the capability information is the UE capability information illustrated in FIG. 10. The base station 12 then determines, based on the capability information for the wireless device 20, whether the wireless device 20 has the ability to communicate (both transmit and receive) in both the uplink and downlink (e.g., in FDD systems, in both the uplink and downlink frequency bands) (step 1002). If not, the process ends. If so, the base station 12 determines whether the wireless device 20 has an available power supply (step 1004). If not, the process ends. If so, the base station 12 determines whether the wireless device 20 has a suitable traffic profile for a candidate device-anchor base station, e.g., whether the traffic profile of the wireless device 20 indicates a periodicity that is greater than a predefined threshold (N) (step 1006). If not, the process ends. If so, the base station 12 determines whether the wireless device 20 is static (step 1008). If not, the process ends. If so, the wireless device 20 is identified, or selected, as a candidate device-anchor base station (step 1010).

Figure 12:
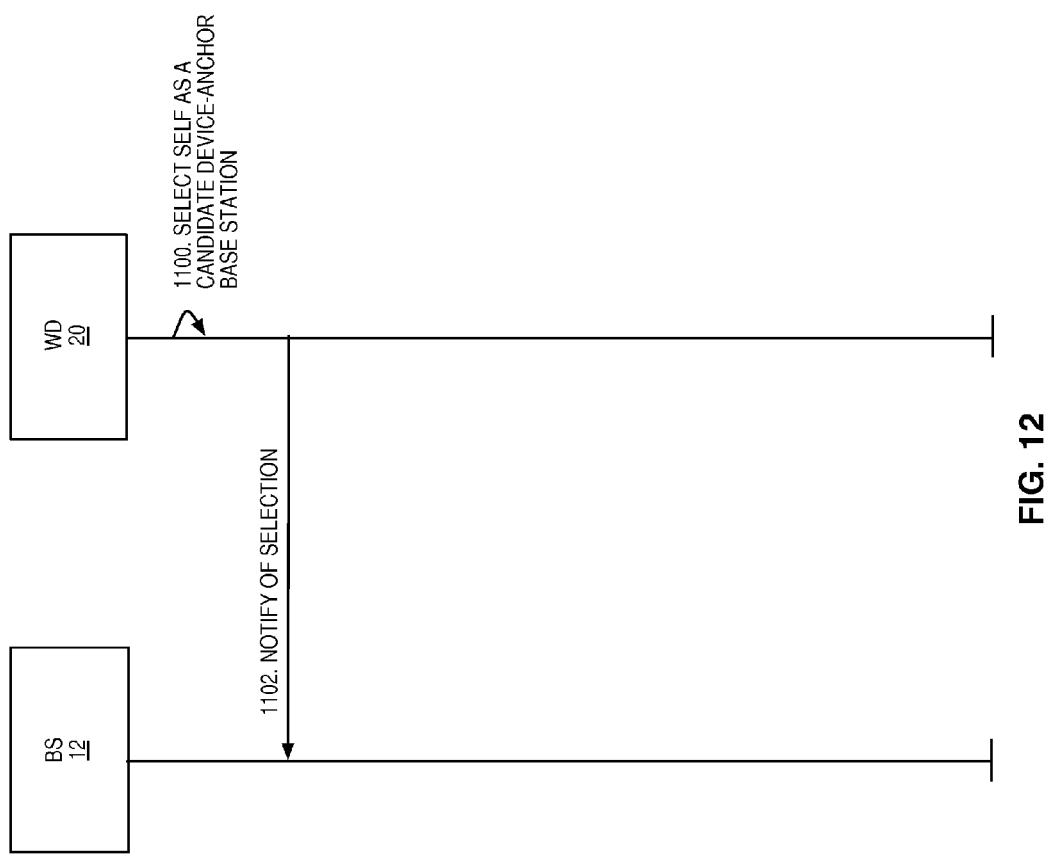
FIG. 12 illustrates a process in which a wireless device selects itself as a candidate device-anchor base station according to one embodiment of the present disclosure.

In some of the embodiments described above, the selection of the candidate device-anchor base stations is performed at the network level (e.g., by the base station 12). FIG. 12 illustrates another embodiment in which the wireless device 20 selects itself as a candidate device-anchor base station. As illustrated, the wireless device 20 selects itself as a candidate device-anchor base station (step 1100). As an example, the wireless device 20 may use any of the embodiments described above for candidate device-anchor base station selection in order to select itself as a candidate device-anchor base station. The wireless device 20 then notifies the base station 12 that it has been selected as a candidate device-anchor base station (step 1102). This notification may be made via, for example, an additional field added in an RRCConnectionRequest message indicating that the wireless device 20 has the ability to operate as a device-anchor base station. As another example, the wireless device 20 may inform the base station 12 that it belongs to a new wireless device category for candidate device-anchor base stations.

Figure 13A:
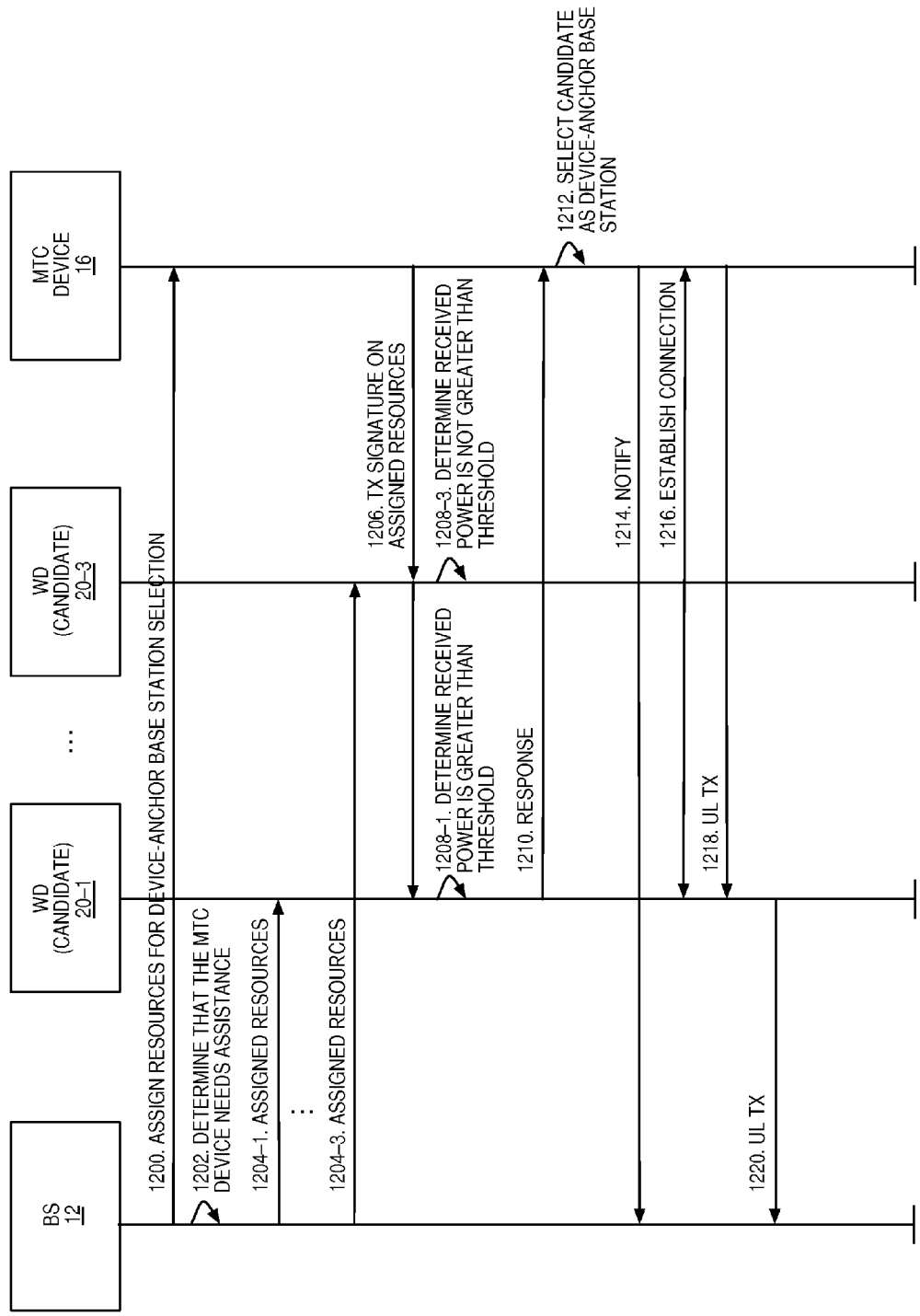
FIGS. 13A through 13C illustrate a process by which the MTC device selects the device-anchor base station for the MTC device from a number of candidate device-anchor base stations according to one embodiment of the present disclosure.
Figure 13B:
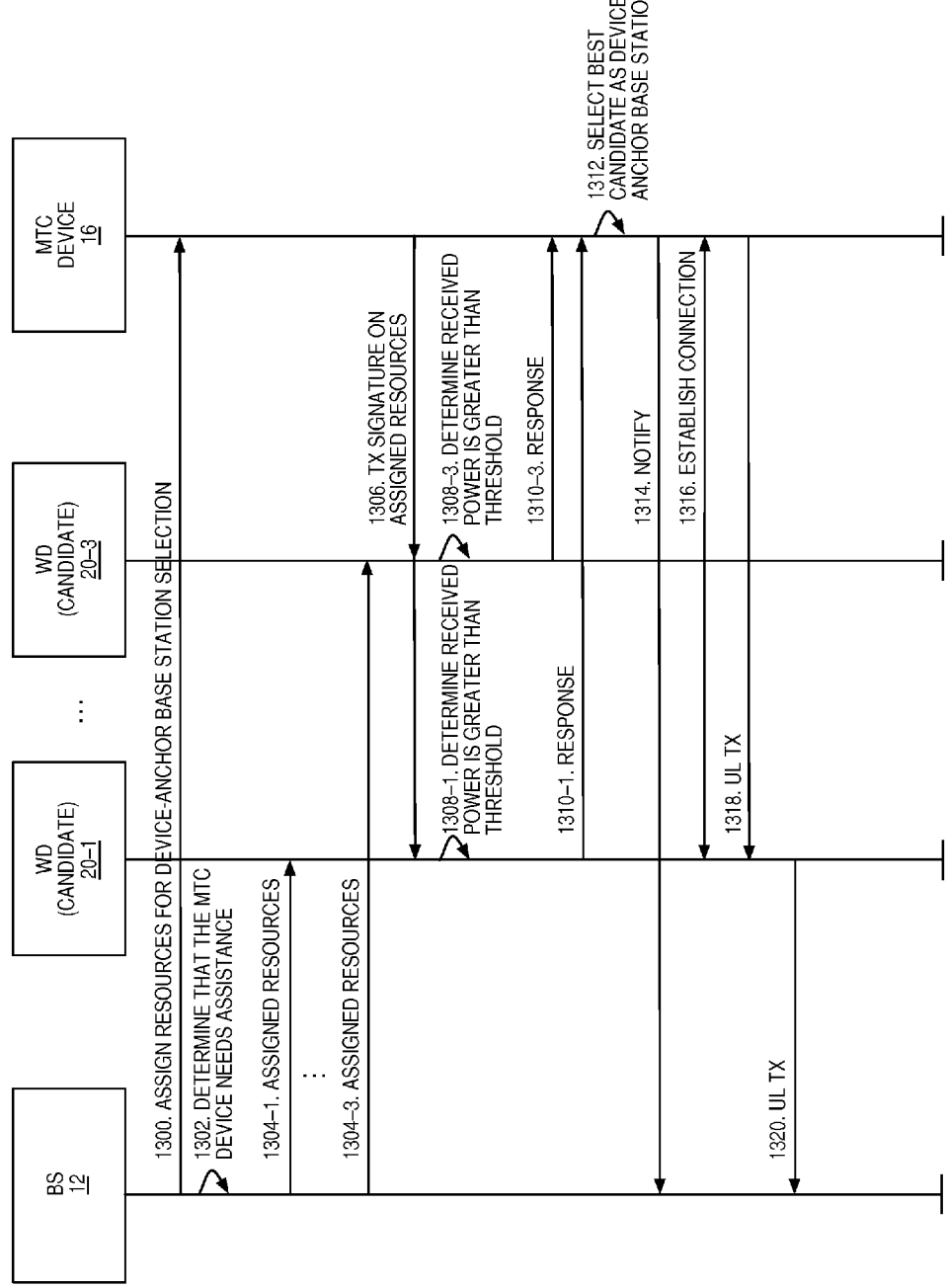
Figure 13C:
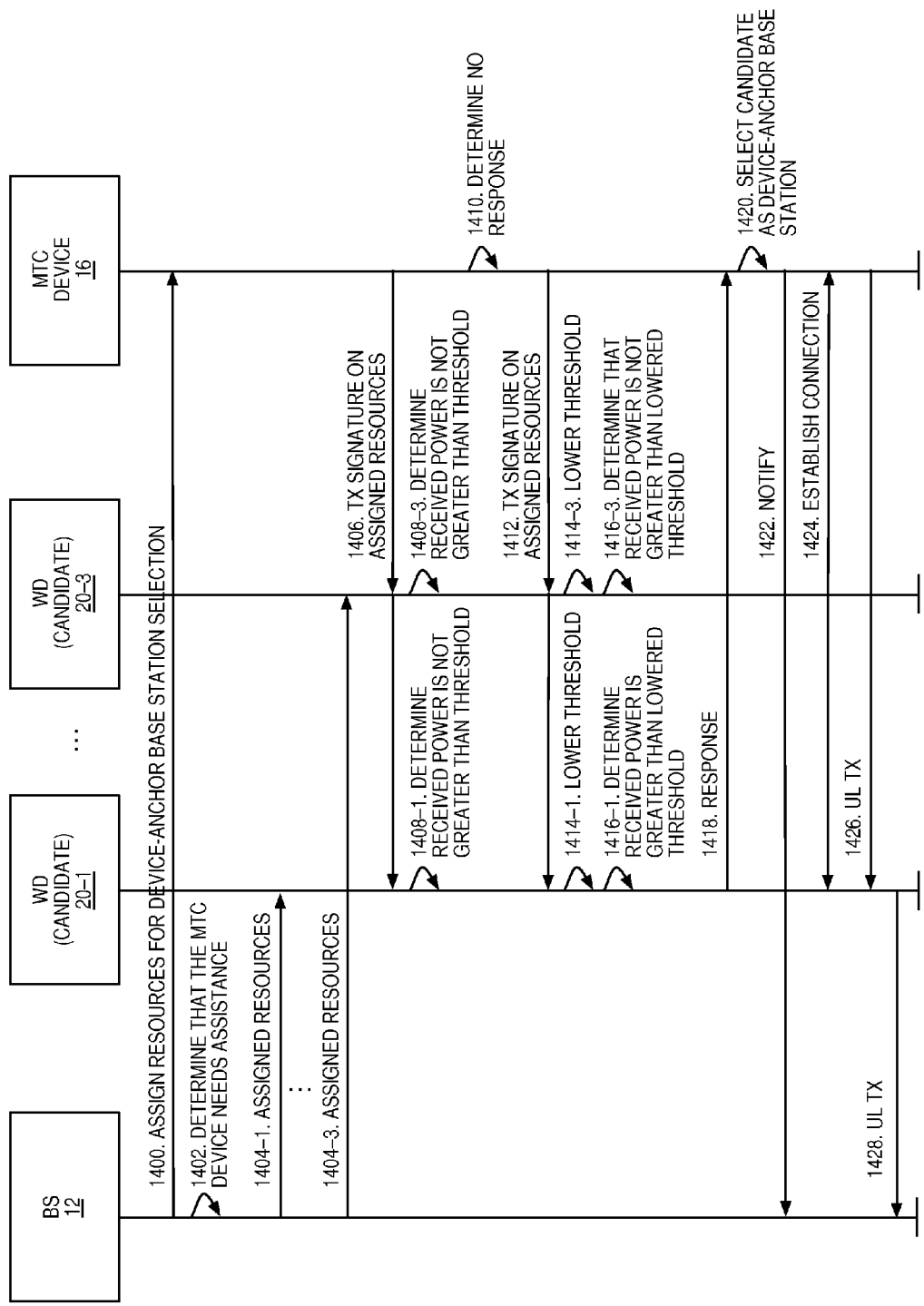

FIGS. 13A, 13B, and 13C through 18 now turn to embodiments for selecting a candidate device-anchor base station as a device-anchor base station according to step 102 of FIG. 2. More specifically, FIGS. 13A-13C illustrate embodiments in which the wireless device in need of assistance, which in these examples is the MTC device 16, selects a device-anchor base station for itself from a number of candidate device-anchor base stations. While these embodiments are described with respect to the example of FIG. 2, these embodiments are not limited thereto. As illustrated in FIG. 13A, the base station 12 assigns time and/or frequency resources (i.e., radio resources) to the MTC device 16 for device-anchor base station selection (step 1200). Note, as used herein, a radio resource is any radio resource such as, for example, a time and/or frequency resource, a code resource (e.g., as in Wideband Code Division Multiple Access (WCDMA)), or the like. Further, while in some examples described herein time and/or frequency resources are used, other types of radio resources may additionally or alternatively be used.

In addition to the time and/or frequency resources, the MTC device 16 is assigned a signature for device-anchor base station selection. At some point, the base station 12 determines that the MTC device 16 is in need of assistance (step 1202). The base station 12 may determine that the MTC device 16 is in need of assistance in any suitable manner. For example, the base station 12 may determine that the MTC device 16 is in need of assistance when the MTC device 16 is in the coverage hole 18, is about to enter the coverage hole 18, or is expected to enter the coverage hole 18. As another example, the base station 12 may determine that the MTC device 16 is in need of assistance when the load of the cell 14 is greater than a threshold and the MTC device 16 is not a candidate device-anchor base station. Note that these examples are only examples. Any suitable technique or criteria may be used to determine that the MTC device 16 is in need of assistance.

Upon determining that the MTC device 16 is in need of assistance, the base station 12 sends the time and/or frequency resources, or more specifically information indicative of the time and/or frequency resources, assigned to the MTC device 16 to the candidate device-anchor base stations, which in this example are the wireless devices 20-1 through 20-3 (steps 1204-1 through 1204-3). In addition to the time and/or frequency resources, the base station 12 may send the signature, or information indicative of the signature, assigned to the MTC device 16 for device-anchor base station selection to the candidate device-anchor base stations 20-1 through 20-3. Thereafter, in order to detect one or more of the candidate device-anchor base stations 20-1 through 20-3, the MTC device 16 transmits the signature assigned to the MTC device 16 on the time and/or frequency resources assigned to the MTC device 16 for device-anchor base station selection (step 1206). In one embodiment, the signature is a predefined sequence, e.g. a sequence similar to that used for RA which may be referred herein as an "RA-like sequence," e.g. Constant Amplitude Zero Autocorrelation (CAZAC) Zadoff-Chu sequences, or the like.

The wireless devices 20-1 through 20-3, acting as the candidate device-anchor base stations, listen for the transmission of the signature of the MTC device 16 on the time and/or frequency resources assigned to the MTC device 16 for device-anchor base station selection. Each of the wireless devices 20-1 through 20-3 determines whether a received power for the transmission is greater than a predefined threshold (steps 1208-1 through 1208-3). In this example, the received power at the wireless devices 20-2 and 20-3 is not greater than the threshold and, as such, those wireless devices 20-2 and 20-3 do not respond. In contrast, the received power at the wireless device 20-1 is greater than the predefined threshold. As such, the wireless device 20-1 transmits a response to the MTC device 16 (step 1210). The response may include the received power level for the transmission of the signature at the wireless device 20-1.

Upon receiving the response, the MTC device 16 has detected the wireless device 20-1 as a candidate device-anchor base station. The MTC device 16 selects the wireless device 20-1 as the device-anchor base station for the MTC device 16 (step 1212). In this embodiment, the MTC device 16 then notifies the base station 12 that the MTC device 16 has selected the wireless device 20-1 as its device-anchor base station (step 1214). As one alternative, the MTC device 16 may notify the wireless device 20-1 that the MTC device 16 has selected the wireless device 20-1 as its device-anchor base station, and then the wireless device 20-1 may notify the base station 12 of the selection. Once the wireless device 20-1 is selected as the device-anchor base station, in this embodiment, the MTC device 16 and the wireless device 20-1 communicate to establish a connection (step 1216). Thereafter, when the MTC device 16 transmits on the uplink, the wireless device 20-1, acting as the device-anchor base station of the MTC device 16, receives the transmission and re-transmits the uplink transmission to the base station 12 (steps 1218 and 1220). The transmission of the uplink transmission from the device-anchor base station to the base station 12 can use the same or different time and/or frequency resources as the uplink transmission from the MTC device 16.

FIG. 13B is similar to FIG. 13A, but where multiple candidate device-anchor base stations respond to the transmission of the signature by the MTC device 16. More specifically, as illustrated, the base station 12 assigns time and/or frequency resources to the MTC device 16 for device-anchor base station selection (step 1300). In addition to the time and/or frequency resources, the MTC device 16 is assigned a signature for device-anchor base station selection. At some point, the base station 12 determines that the MTC device 16 is in need of assistance, as discussed above (step 1302). Upon determining that the MTC device 16 is in need of assistance, the base station 12 sends the time and/or frequency resources, or more specifically information indicative of the time and/or frequency resources, assigned to the MTC device 16 to the candidate device-anchor base stations, which in this example are the wireless devices 20-1 through 20-3 (steps 1304-1 through 1304-3). In addition to the time and/or frequency resources, the base station 12 may send the signature, or information indicative of the signature, assigned to the MTC device 16 for device-anchor base station selection to the candidate device-anchor base stations 20-1 through 20-3. Thereafter, in order to detect one or more of the candidate device-anchor base stations 20-1 through 20-3, the MTC device 16 transmits the signature assigned to the MTC device 16 on the time and/or frequency resources assigned to the MTC device 16 for device-anchor base station selection, as discussed above (step 1306).

The wireless devices 20-1 through 20-3, acting as the candidate device-anchor base stations, listen for the transmission of the signature of the MTC device 16 on the time and/or frequency resources assigned to the MTC device 16 for device-anchor base station selection. Each of the wireless devices 20-1 through 20-3 determines whether a received power for the transmission is greater than a predefined threshold (steps 1308-1 through 1308-3). In this example, the received power at all of the wireless devices 20-1 through 20-3 is greater than the threshold and, as such, all of the wireless devices 20-1 through 20-3 transmit responses to the MTC device 16 (step 1310-1 through 1310-3). The responses may include the received power levels for the transmission of the signature at the corresponding wireless devices 20-1 through 20-3. Note that while the received power is greater than the threshold at all of the wireless devices 20-1 through 20-3 in this example, depending on the situation, the received power may be greater than the threshold at any number of the wireless devices 20-1 through 20-3 (i.e., at 0, 1, 2, or 3 of the wireless devices 20-1 through 20-3 in this example).

Upon receiving the responses, the MTC device 16 has detected the wireless devices 20-1 through 20-3 as candidate device-anchor base stations. The MTC device 16 selects the wireless device 20-1 as the device-anchor base station for the MTC device 16 based on the responses (step 1312). In one embodiment, the responses from the wireless devices 20-1 through 20-3 include the received power levels at the wireless devices 20-1 through 20-3 for the transmission of the signature by the MTC device 16, and the MTC device 16 selects the wireless device 20-1 through 20-3 having the highest received power as the device-anchor base station.

However, any suitable selection process may be used. In this example, the wireless device 20-1 is selected as the device-anchor base station of the MTC device 16.

In this embodiment, the MTC device 16 then notifies the base station 12 that the MTC device 16 has selected the wireless device 20-1 as its device-anchor base station (step 1314). As one alternative, the MTC device 16 may notify the wireless device 20-1 that the MTC device 16 has selected the wireless device 20-1 as its device-anchor base station, and then the wireless device 20-1 may notify the base station 12 of the selection. Once the wireless device 20-1 is selected as the device-anchor base station, in this embodiment, the MTC device 16 and the wireless device 20-1 communicate to establish a connection (step 1316). Thereafter, when the MTC device 16 transmits on the uplink, the wireless device 20-1, acting as the device-anchor base station of the MTC device 16, receives the transmission and re-transmits the uplink transmission to the base station 12 (steps 1318 and 1320). The transmission of the uplink transmission from the device-anchor base station to the base station 12 can use the same or different time and/or frequency resources as the uplink transmission from the MTC device 16.

FIG. 13C is similar to FIGS. 13A and 13B, but where, initially, none of the candidate device-anchor base stations respond to the transmission of the signature by the MTC device 16. More specifically, as illustrated, the base station 12 assigns time and/or frequency resources to the MTC device 16 for device-anchor base station selection (step 1400). In addition to the time and/or frequency resources, the MTC device 16 is assigned a signature for device-anchor base station selection. At some point, the base station 12 determines that the MTC device 16 is in need of assistance, as discussed above (step 1402). Upon determining that the MTC device 16 is in need of assistance, the base station 12 sends the time and/or frequency resources, or more specifically information indicative of the time and/or frequency resources, assigned to the MTC device 16 to the candidate device-anchor base stations, which in this example are the wireless devices 20-1 through 20-3 (steps 1404-1 through 1404-3). In addition to the time and/or frequency resources, the base station 12 may send the signature, or information indicative of the signature, assigned to the MTC device 16 for device-anchor base station selection to the candidate device-anchor base stations 20-1 through 20-3. Thereafter, in order to detect one or more of the candidate device-anchor base stations 20-1 through 20-3, the MTC device 16 transmits the signature assigned to the MTC device 16 on the time and/or frequency resources assigned to the MTC device 16 for device-anchor base station selection, as discussed above (step 1406).

The wireless devices 20-1 through 20-3, acting as the candidate device-anchor base stations, listen for the transmission of the signature of the MTC device 16 on the time and/or frequency resources assigned to the MTC device 16 for device-anchor base station selection. Each of the wireless devices 20-1 through 20-3 determines whether a received power for the transmission is greater than a predefined threshold (steps 1408-1 through 1408-3). In this example, the received power at all of the wireless devices 20-1 through 20-3 is less than the threshold and, as such, none of the wireless devices 20-1 through 20-3 respond.

The MTC device 16 determines that no response has been received to the transmission of its signature, e.g., after a predefined amount of time has elapsed since transmission of the signature (step 1410). In other words, the MTC device 16 has not detected any of the candidate device-anchor base stations 20-1 through 20-3. In order to again attempt detection of one or more of the candidate device-anchor base stations 20-1 through 20-3, the MTC device 16 then retransmits the signature in time and/or frequency resources assigned to the MTC device 16 for device-anchor base station selection (step 1412). Upon again receiving the transmission of the signature of the MTC device 16, the wireless devices 20-1 through 20-3 lower the threshold (steps 1414-1 through 1414-3) and determine whether the received power for the signature of the MTC device 16 is greater than the lowered threshold (steps 1416-1 through 1416-3). In this example, the received power at only the wireless device 20-1 is greater than the lowered threshold. As such, the wireless device 20-1 transmits a response to the MTC device 16 (step 1418). The response may include the received power levels for the transmission of the signature at the wireless device 20-1. Note that while the received power is greater than the lowered threshold at only the wireless device 20-1 in this example, depending on the situation, the received power may be greater than the lowered threshold at any number of the wireless devices 20-1 through 20-3 (i.e., at 0, 1, 2, or 3 of the wireless devices 20-1 through 20-3 in this example).

Upon receiving the response, the MTC device 16 has detected the wireless device 20-1 as a candidate device-anchor base station. The MTC device 16 selects the wireless device 20-1 as the device-anchor base station for the MTC device 16, as discussed above (step 1420). In this embodiment, the MTC device 16 then notifies the base station 12 that the MTC device 16 has selected the wireless device 20-1 as its device-anchor base station (step 1422). As one alternative, the MTC device 16 may notify the wireless device 20-1 that the MTC device 16 has selected the wireless device 20-1 as its device-anchor base station, and then the wireless device 20-1 may notify the base station 12 of the selection. Once the wireless device 20-1 is selected as the device-anchor base station, in this embodiment, the MTC device 16 and the wireless device 20-1 communicate to establish a connection (step 1424). Thereafter, when the MTC device 16 transmits on the uplink, the wireless device 20-1, acting as the device-anchor base station of the MTC device 16, receives the transmission and re-transmits the uplink transmission to the base station 12 (steps 1426 and 1428). The transmission of the uplink transmission from the device-anchor base station to the base station 12 can use the same or different time and/or frequency resources as the uplink transmission from the MTC device 16.

Figure 14:
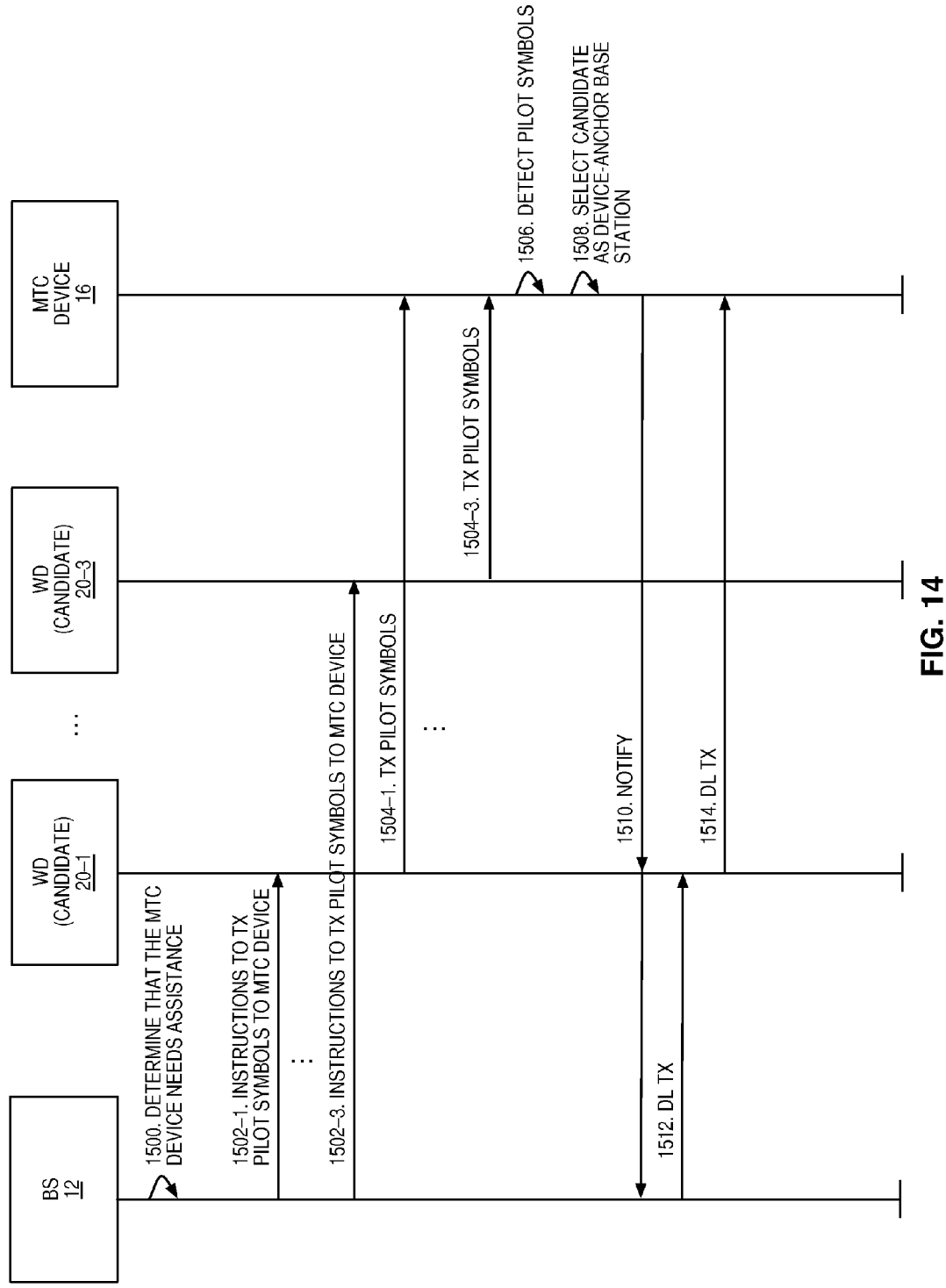
FIG. 14 illustrates a process by which the MTC device selects the device-anchor base station for the MTC device from a number of candidate device-anchor base stations according to another embodiment of the present disclosure.

FIG. 14 illustrates an embodiment in which the wireless device in need of assistance, which in this example is the MTC device 16, selects a device-anchor base station for itself from a number of candidate device-anchor base stations. This embodiment may be particularly beneficial in the case of downlink traffic in which the base station 12 transmits data towards, for example, the MTC device 16, which is known to be in the coverage hole 18 (or the base station 12 knows that the MTC device 16 is otherwise in need of assistance). Again, in the example of FIG. 14, the MTC device 16 is in need of assistance. However, the present disclosure is not limited thereto.

As illustrated, the base station 12 determines that the MTC device 16 is in need of assistance (step 1500). The base station 12 may determine that the MTC device 16 is in need of assistance in any suitable manner. For example, the base station 12 may determine that the MTC device 16 is in need of assistance when the MTC device 16 is in the coverage hole 18, is about to enter the coverage hole 18, or is expected to enter the coverage hole 18. As another example, the base station 12 may determine that the MTC device 16 is in need of assistance when the load of the cell 14 is greater than a threshold and the MTC device 16 is not a candidate device-anchor base station. Note that these examples are only examples. Any suitable technique or criteria may be used to determine that the MTC device 16 is in need of assistance.

Upon determining that the MTC device 16 is in need of assistance, the base station 12 sends instructions to the wireless devices 20-1 through 20-3, which are the candidate device-anchor base stations, to transmit pilot symbols to the MTC device 16 (steps 1502-1 through 1502-3). The wireless devices 20-1 through 20-3 then transmit the pilot symbols to the MTC device 16 (steps 1504-1 through 1504-3). The MTC device 16 detects the pilots symbols (and thus the candidate device-anchor base stations 20-1 through 20-3) and then selects one of the candidate device-anchor base stations (i.e., one of the wireless devices 20-1 through 20-3) as a device-anchor base station for the MTC device 16 (steps 1506 and 1508). In one example, the MTC device 16 selects the device-anchor base station based on received power levels for the pilot symbols received from the wireless devices 20-1 through 20-3. In this example, the wireless device 20-1 has the highest received power and is therefore selected as the device-anchor base station of the MTC device 16. While received power can be used as the selection criterion, one or more additional or alternative criteria may be used for the selection.

In this embodiment, the MTC device 16 then notifies the wireless device 20-1 that it has been selected as the device-anchor base station of the wireless device 20-1 (step 1510). As illustrated, the wireless device 20-1 may then notify the base station 12 that the wireless device 20-1 has been selected as the device-anchor base station of the MTC device 16. Thereafter, the base station 12 transmits a downlink transmission for the MTC device 16 (step 1512). The wireless device 20-1, operating as the device-anchor base station of the MTC device 16, receives the downlink transmission and transmits the downlink transmission to the MTC device 16 (step 1514). The transmission of the downlink transmission from the device-anchor base station to the MTC device 16 can use the same or different time and/or frequency resources as the downlink transmission from the base station 12.

Figure 15:
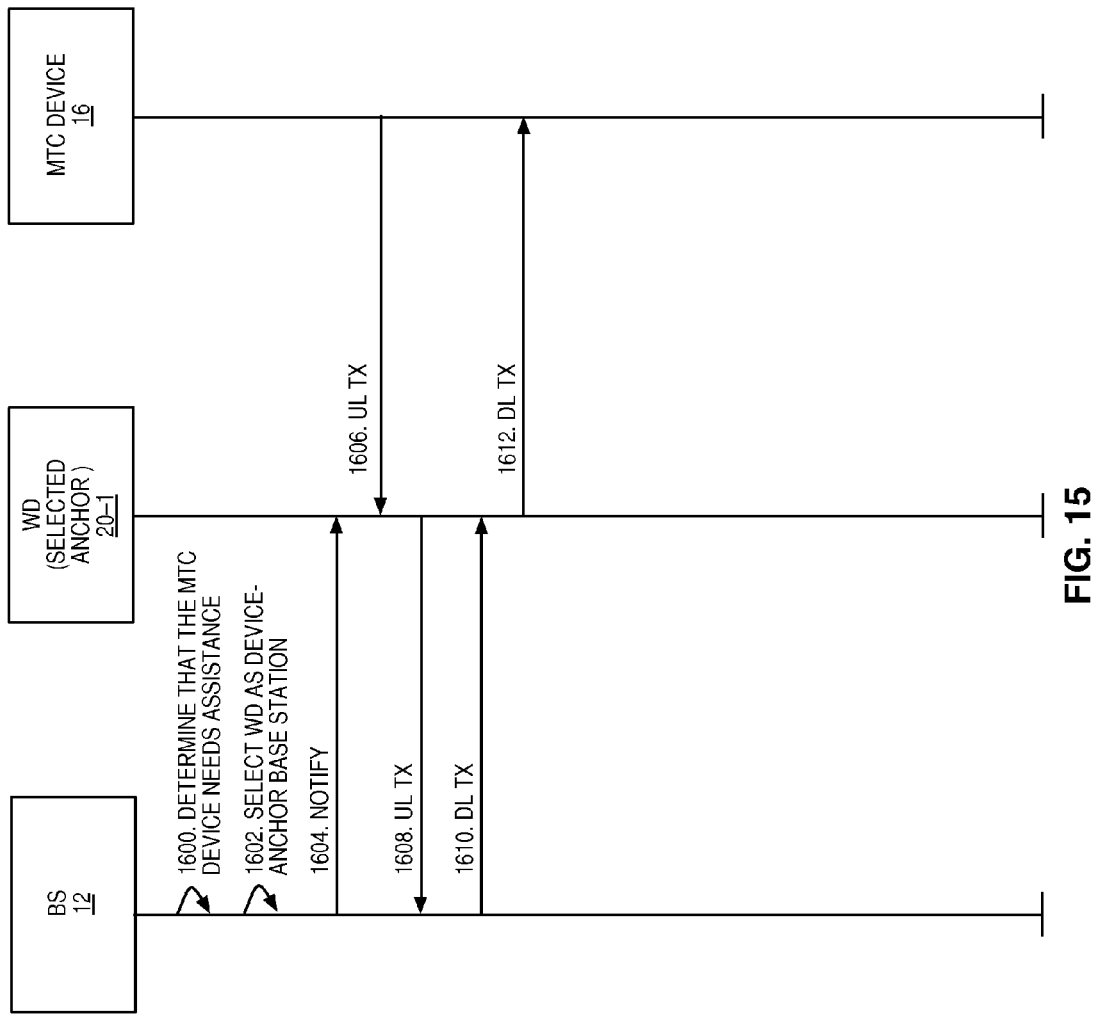
FIG. 15 illustrates a process by which the base station selects the device-anchor base station for the MTC device from a number of candidate device-anchor base stations according to one embodiment of the present disclosure.

In the embodiments of FIGS. 13A-13C and FIG. 14, the selection of the device-anchor base station for the MTC device 16 is performed by the MTC device 16. FIG. 15 illustrates another embodiment in which a network node performs the selection. In the particular example of FIG. 15, the base station 12 selects a device-anchor base station for the MTC device 16. However, the process may be performed by other network nodes and for other wireless devices that are in need of assistance. As illustrated, the base station 12 determines that the MTC device 16 is in need of assistance, as discussed above (step 1600). Upon determining that the MTC device 16 is in need of assistance, the base station 12 selects one of the candidate device-anchor base stations as a device-anchor base station of the MTC device 16 (step 1602). In this example, the wireless device 20-1 is selected as the device-anchor base station of the MTC device 20-1. Any suitable selection process and criteria may be used. As one example, the base station 12 may have knowledge of the positions of the MTC device 12 and the candidate device-anchor base stations and then select the candidate device-anchor base station that is closest to the MTC device 16 as the device-anchor base station of the MTC device 16. In another embodiment, the base station 12 may have knowledge that the MTC device 16 is in the coverage hole 18 and knowledge of the positions of the candidate device-anchor base stations, where the base station 12 selects the candidate device-anchor base station that is closest to the coverage hole 18 as the device-anchor base station of the MTC device 16.

The base station 12 then notifies the wireless device 20-1 that it has been selected as the device-anchor base station of the MTC device 16 (step 1604). The base station 12 may provide any information needed by the wireless device 20-1 to serve as the device-anchor base station of the MTC device 16. In one example, the wireless device 20-1 serves as the device-anchor base station of the MTC device 16 in a manner that is transparent to the MTC device 16. Thereafter, the MTC device 16 transmits an uplink transmission (step 1606). The wireless device 20-1, operating as the device-anchor base station of the MTC device 16, receives the uplink transmission from the MTC device 16 and transmits the uplink transmission to the base station 12 (step 1608). Likewise, for the downlink, the base station 12 transmits a downlink transmission for the MTC device 16 (step 1610). The wireless device 20-1, acting as the device-anchor base station of the MTC device 16, receives the downlink transmission and transmits the downlink transmission to the MTC device 16 (step 1612). In one example, for both the uplink and downlink, the wireless device 20-1 operates in such a manner that the wireless device 20-1 is transparent to the MTC device 16 (i.e., to the MTC device 16, it appears as though the MTC device 16 is communicating directly with the base station 12).

As discussed above, in some embodiments, the device-anchor base station 20-1 is transparent to the MTC device 16. In other words, the MTC device 16 is not aware that communication between the MTC device 16 and the base station 12 is done with the help of the device-anchor base station 20-1 of the MTC device 16 or even N device-anchor base stations in a multi-hop scenario (i.e., where a device-anchor base station is connected to the base station 12 through one or more additional hops, e.g., one or more additional device-anchor base stations). In some embodiments, in order to enable this transparency, the cellular communications network 10 obtains knowledge of the traffic patterns of all or at least some of the wireless devices in the cellular communications network 10, e.g., every installed wireless device in the cellular communications network 10 with a given traffic pattern is registered with the cellular communications network 10 and the base station 12 is aware of the traffic pattern of each fixed wireless device (e.g., the MTC device 16) with a well-defined traffic pattern located in the cell 14. The information relating to traffic pattern can indicate for the wireless device one or more of periodicity of transmissions, average data transmission size, transmission start time offset, and mobility pattern, etc. The information may be provided to the cellular communications network 10 (e.g., to the base station 12) via an IE such as, for example, that illustrated in FIG. 16.

For example, assume that three temperature meters (which are MTC devices) are transmitting temperature measurements periodically on different time slots as shown in FIG. 17. Assume that that temperature meter #1 is located in a coverage hole and is therefore in need of assistance and that the other two temperature meters #2 and #3 are located nearby and can act as the device-anchor base station for temperature meter #1 (i.e., are candidate device-anchor base stations). In one embodiment, the base station 12 assigns temperature meter #2 to be the device-anchor base station for temperature meter #1 by considering the traffic patterns of temperature meters #1 and #2. In other words, the base station 12 assigns temperature meter #2 to be the device-anchor base station for temperature meter #1 because the traffic patterns of temperature meters #1 and #2 can co-exist, or in other words do not overlap. Then, the base station 12 can send a request to temperature meter #2 (as the device-anchor base station of temperature meter #1) to, for example, fetch the temperature measurements from temperature meter #1. The temperature meter #2 may then transmit both the temperature measurements from temperature meter #1 and its own temperature measurements to the base station 12 because the traffic patterns for these two temperature meters do not overlap. In contrast, the traffic patterns of temperature meters #1 and #3 do overlap and, as such, temperature meter #3 cannot, in this embodiment, serve as the device-anchor base station of temperature meter #1.

The embodiments above have focused on selecting and using a single device-anchor base station. However, in other embodiments, more than one device-anchor base station can be selected for a wireless device in need of assistance (e.g., more than one device-anchor base station may be selected for the MTC device 16 in the coverage hole 18). This may be desirable to enable multi-point operation. One such example is illustrated in FIG. 18 where three wireless devices 20-1, 20-2, and 20-3 are selected and operate as device-anchor base stations for the MTC device 16. In this embodiment, for uplink transmission, the MTC device 16 transmits an uplink transmission. Each of the wireless devices 20-1, 20-2, and 20-3, operating as device-anchor base stations, receives the uplink transmission and transmits the uplink transmission to the base station 12. For this uplink scenario, multiple copies of the uplink transmission are received by the base station 12 and can be combined according to a multi-point reception scheme to thereby improve reception robustness. Similarly, for the downlink the base station 12 transmits a downlink transmission. Each of the wireless devices 20-1, 20-2, and 20-3, operating as device-anchor base stations, receives the downlink transmission and transmits the downlink transmission to the MTC device 16. The multiple copies of the downlink transmission received by the MTC device 16 can be combined at the MTC device 16 according to a multi-point reception scheme to thereby improve reception robustness.

In some embodiments, the candidate device-anchor base stations may be static devices. In this case, in one particular embodiment, the static candidate device-anchor base stations are divided into groups according to their geographic locations. One such embodiment is illustrated in FIG. 19. As illustrated, in the embodiment of FIG. 19, the cellular communications network 10 includes the base station 12, the MTC device 16 in the coverage hole 18, and a number of wireless devices 20 having the ability to serve as candidate device-anchor base stations that are divided into three groups 22-1, 22-2, and 22-3 based on their geographic locations. In in particular, wireless devices 20(1)-1 through 20(1)-$N_1$ are candidate device-anchor base stations in the first group 22-1, wireless devices 20(2)-1 through 20(2)-$N_2$ are candidate device-anchor base stations in the second group 22-2, and wireless devices 20(3)-1 through 20(3)-$N_3$ are candidate device-anchor base stations in the third group 22-3. In one example, the wireless devices 20(1)-1 through 20(1)-$N_1$, 20(2)-1 through 20(2)-$N_2$, and 20(3)-1 through 20(3)-$N_3$ are static devices such that the grouping occurs only once. However, in another embodiment, the wireless devices 20(1)-1 through 20(1)-$N_1$, 20(2)-1 through 20(2)-$N_2$, and 20(3)-1 through 20(3)-$N_3$ are mobile (e.g., have low mobility) and the grouping can be updated as desired.

When the MTC device 16 needs assistance, the base station 12 selects a group of candidate device-anchor base stations according to their geographic locations relative to the MTC device 16 or, in this example, the position of the coverage hole 18. The location, or position, information for the wireless devices 20 and the MTC device 16 can be sent to the network via, for example, RRC signaling during device setup by adding a location information IE to the RRC connection request message, as illustrated in FIG. 20. Then, one or more device-anchor base stations are selected for the MTC device 16 from the selected group of candidate device-anchor base stations using, for example, any of the selection schemes discussed above.

In another embodiment, for static devices that are registered at the network, once there is a connection established between two devices, a network node (e.g., a radio access node such as the base station 12) may store information identifying the two devices as a device-anchor base station and device in need pair. A list of paired devices may be stored at the network node (e.g., at the base station 12) for future decisions. When a particular wireless device needs assistance, the pairing may be used to automatically select the appropriate device-anchor base station for the wireless device. FIG. 21 is a flow chart that illustrates the operation of the base station 12 (or other radio access node) to operate according to one such embodiment.

As illustrated in FIG. 21, the base station 12 stores pairings from connections between wireless devices 16, 20 and device-anchor base stations (step 1700). For example, since the wireless device 20-1 was previously selected as the device-anchor base station for the MTC device 16, a corresponding pairing is stored by the base station 12. Subsequently, the base station 12 determines that, in this example, the MTC device 16 is in need of assistance (step 1702). The base station 12 then determines whether a pairing is stored for the MTC device 16 (step 1704). If so, the base station 12 selects the device-anchor base station for the MTC device 16 according to the stored pairing (step 1706). If not, in this example, the base station 12 selects a device-anchor base station for the MTC device 16 (step 1708). Alternatively, a device-anchor base station can be selected by the MTC device 16, as described with respect to some of the embodiments above. Lastly, in this embodiment, a connection is established between the MTC device 16 and the device-anchor base station (step 1710). In this manner, by storing pairings, selection of a device-anchor base station may only be performed once for static or low-mobility devices.

Although the described embodiments may be implemented in any appropriate type of telecommunication system supporting any suitable communication standards and using any suitable components, particular embodiments of the described solutions may be implemented in a 3GPP LTE cellular communications network 10, such as that illustrated in FIG. 1. As shown in FIG. 1, the example cellular communications network 10 may include wireless communication devices 16, 20 (e.g., conventional wireless devices (UEs) or MTC devices), one or more radio access network nodes (e.g., Evolved Node Bs (eNBs) or other base stations, radio network controllers, gateways, or relay nodes) capable of supporting communication for the wireless devices 16, 20, along with any additional elements suitable to enable communication between wireless devices or between a wireless device and another communication device (such as a landline telephone). At least some of the wireless devices 16, 20 are capable of serving as device-anchor base stations, as described above.

Although the illustrated wireless devices 20 may represent communication devices that include any suitable combination of hardware or any suitable combination of hardware and software, the wireless devices 20 may, in particular embodiments, represent devices such as the example wireless device 20 illustrated in greater detail by FIG. 22. As shown in FIG. 22, the example wireless device 20 includes a processor 24, a memory 26, a transceiver 28, and one or more antennas 30. In particular embodiments, some or all of the functionality described above as being provided by the wireless device 20 may be provided by the processor 24 executing instructions stored on a computer-readable medium, such as the memory 26. Alternative embodiments of the wireless device 20 may include additional components beyond those shown in FIG. 22 that may be responsible for providing certain aspects of the functionality of the wireless device 20, including any of the functionality described above and/or any functionality necessary to support the embodiments described above.

Similarly, although the illustrated MTC device 16 may represent communication devices that include any suitable combination of hardware or any suitable combination of hardware and software, the MTC device 16 may, in particular embodiments, represent devices such as the example MTC device 16 illustrated in greater detail by FIG. 23. As shown in FIG. 23, the example MTC device 16 includes a processor 32, a memory 34, a transceiver 36, and one or more antennas 38. In particular embodiments, some or all of the functionality described above as being provided by the MTC device 16 may be provided by the processor 32 executing instructions stored on a computer-readable medium, such as the memory 34. Alternative embodiments of the MTC device 16 may include additional components beyond those shown in FIG. 23 that may be responsible for providing certain aspects of the functionality of the MTC device 16, including any of the functionality described above and/or any functionality necessary to support the embodiments described above.

Lastly, although the illustrated base station 12 may represent base stations that include any suitable combination of hardware or any suitable combination of hardware and software, these nodes may, in particular embodiments, represent devices such as the example base station 12 illustrated in greater detail by FIG. 24. As shown in FIG. 24, the example base station 12 includes a baseband unit 40 having a processor 42, a memory 44, and a network interface 46, and a radio unit 48 having a transceiver 50 connected to one or more antennas 52. This discussion equally applies to other types of radio access nodes. In particular embodiments, some or all of the functionality described above as being provided by the base station 12 may be provided by the processor 42 executing instructions stored on a computer-readable medium, such as the memory 44. Alternative embodiments of the base station 12 may include additional components responsible for providing additional functionality, including any of the functionality identified above and/or any functionality necessary to support the embodiments described above.

The following acronyms are used throughout this disclosure.

3GPP 3$^{rd}$ Generation Partnership Project
5G 5$^{th}$ Generation
CAZAC Constant Amplitude Zero Autocorrelation
CQI Channel Quality Indication
dB Decibel
DOA Direction of Arrival
eNB Evolved Node B
FDD Frequency Division Duplexing
HARQ Hybrid Automatic Repeat Request
HSPA High Speed Packet Access
IE Information Element
LTE Long Term Evolution
M2M Machine-to-Machine
MTC Machine Type Communication
PDCP Packet Data Convergence Protocol
PUSCH Physical Uplink Shared Channel
QPSK Quadrature Phase Shift Keying
RA Random Access
RF Radio Frequency
RLC Radio Link Control
RLF Radio Link Failure
RRC Radio Resource Control
RSRP Reference Signal Received Power
RSS Received Signal Strength
SINR Signal-to-Interference Plus Noise Ratio
TDD Time Division Duplexing
TTI Transmission Time Interval
UE User Equipment
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a network node of a cellular communications network, comprising:
   determining that assistance from device-anchor base stations is needed in a cell served by a serving base station of a wireless device if one or more coverage holes are located in the cell;
   selecting a plurality of candidate device-anchor base stations for the cell served by the serving base station, the plurality of candidate device-anchor base stations being wireless devices that satisfy one or more predefined criteria for serving as a candidate device-anchor base station and selecting the plurality of candidate device-anchor base stations comprises:
      obtaining information that is indicative of capabilities of a second wireless device, the second wireless device being comprised in the plurality of candidate device-anchor base stations;
      determining whether the second wireless device satisfies one or more predefined criteria for being a candidate device-anchor base station based on the information; and
      selecting the second wireless device as a candidate device-anchor base station if the second wireless device is determined to satisfy the one or more predefined criteria for being a candidate device-anchor base station; and
   effecting selection of a device-anchor base station for the wireless device from the plurality of candidate device-anchor base stations such that communication between the serving base station of the wireless device and the wireless device is via the device-anchor base station.

2. The method of claim 1 wherein obtaining the information comprises obtaining the information that is indicative of the capabilities of the second wireless device from the second wireless device.

3. The method of claim 2 wherein obtaining the information that is indicative of the capabilities of the second wireless device from the second wireless device comprises receiving one or more information elements containing the information from the second wireless device via Radio Resource Control, RRC, signaling.

4. The method of claim 1 wherein obtaining the information that is indicative of the capabilities of the second wireless device from the second wireless device comprises receiving information that is indicative of a device type of the second wireless device, wherein the device type of the second wireless device is indicative of the capabilities of the second wireless device.

5. The method of claim 1 wherein obtaining the information that is indicative of the capabilities of the second wireless device comprises obtaining information that is indicative of at least one capability selected from a group consisting of: a capability of the second wireless device to communicate in both an uplink and a downlink direction, an energy profile of the second wireless device, a traffic profile of the second wireless device, and a mobility pattern of the second wireless device.

6. The method of claim 1 wherein obtaining the information that is indicative of the capabilities of the second wireless device comprises obtaining information that is indicative of at least one capability selected from a group consisting of: a capability of the second wireless device to operate as a relay, a capability of the second wireless device to operate as a repeater, a number of antennas of the second wireless device, proximity of the second wireless device to a serving base station, proximity of the second wireless device to one or more other wireless devices in need of assistance, and a number of wireless devices that can be accommodated by the second wireless device as a device-anchor base station.

7. The method of claim 1 wherein the one or more predefined criteria for being a candidate device-anchor base station comprise a criterion of being capable of communicating in both an uplink and a downlink direction.

8. The method of claim 1 wherein the one or more predefined criteria for being a candidate device-anchor base station comprise a criterion of being connected to a permanent power supply.

9. The method of claim 1 wherein the one or more predefined criteria for being a candidate device-anchor base station comprise a criterion of having a desired traffic profile.

10. The method of claim 1 wherein the one or more predefined criteria for being a candidate device-anchor base station comprise a criterion of having low mobility.

11. The method of claim 1 further comprising receiving information from the second wireless device that is indicative of whether the second wireless device is selected as a candidate device-anchor base station.

12. The method of claim 1 wherein selecting the plurality of candidate device-anchor base stations comprises selecting the plurality of candidate device-anchor base stations in response to determining that assistance from device-anchor base stations is needed in the cell served by the serving base station of the wireless device.

13. The method of claim 1 wherein determining that assistance from device-anchor base stations is needed in the cell if the one or more coverage holes are located in the cell comprises:
determining that there are one or more predefined coverage holes located in the cell; and
in response, determining that assistance from device-anchor base stations is needed in the cell.

14. The method of claim 1 wherein determining that assistance from device-anchor base stations is needed in the cell if the one or more coverage holes are located in the cell comprises:

receiving information from one or more wireless devices that indicates that the one or more wireless devices have detected the one or more coverage holes in the cell; and
in response, determining that assistance from device-anchor base stations is needed in the cell.

15. The method of claim 1 wherein determining that assistance from device-anchor base stations is needed in the cell if the one or more coverage holes are located in the cell comprises:
detecting the one or more coverage holes in the cell; and
in response, determining that assistance from device-anchor base stations is needed in the cell.

16. The method of claim 15 wherein at least one coverage hole is a partial coverage hole.

17. The method of claim 16 wherein detecting the one or more coverage holes in the cell comprises detecting the partial coverage hole in response to a predefined number of consecutive unsuccessful Physical Uplink Shared Channel, PUSCH, transmissions from a second wireless device when the second wireless device is located in the partial coverage hole.

18. The method of claim 15 wherein detecting the one or more coverage holes in the cell comprises detecting a coverage hole based on one or more Radio Link Failure, RLF, reports for radio link failures that occurred in the coverage hole.

19. The method of claim 15 wherein detecting the one or more coverage holes in the cell comprises detecting a coverage hole based on at least one of a group consisting of: received power with respect to a second wireless device when the second wireless device is located in the coverage hole, Signal-to-Interference plus Noise Ratio, SINR, with respect to the second wireless device when the second wireless device is located in the coverage hole, and Hybrid Automatic Repeat Request, HARQ, NACK rate with respect to the second wireless device when the second wireless device is located in the coverage hole.

20. The method of claim 15 wherein detecting the one or more coverage holes in the cell comprises detecting a coverage hole in response to a second wireless device operating in a coverage enhancement mode of operation when located in the coverage hole.

21. The method of claim 15 wherein detecting the one or more coverage holes in the cell comprises detecting a coverage hole in response to failed communication with a second wireless device when the second wireless device is located in the coverage hole.

22. The method of claim 1 wherein determining that assistance from device-anchor base stations is needed in the cell comprises determining that assistance from device-anchor base stations is needed in the cell if a network load for the cell is greater than a predefined threshold representative of a high network load.

23. The method of claim 1 wherein determining that assistance from device-anchor base stations is needed in the cell comprises determining that assistance from device-anchor base stations is needed in the cell in response to a predefined number of consecutive random access attempts from a second wireless device.

24. The method of claim 1 wherein the wireless device is a Machine Type Communication, MTC, device located in a coverage hole.

25. The method of claim 1 wherein the wireless device is a Machine Type Communication, MTC, device and a network load of the cell served by the serving base station of the wireless device is greater than a predefined threshold representative of a high network load.

26. A network node of a cellular communications network, comprising:

a transceiver; and a processor associated with the transceiver and configured to:

determining that assistance from device-anchor base stations is needed in a cell served by a serving base station of a wireless device if one or more coverage holes are located in the cell;

select a plurality of candidate device-anchor base stations for the cell served by the serving base station, the plurality of candidate device-anchor base stations being wireless devices that satisfy one or more predefined criteria for serving as a candidate device-anchor base station and, in order to select the plurality of candidate device-anchor base stations, the processor is further configured to:

obtain information that is indicative of capabilities of a second wireless device, the second wireless device being comprised in the plurality of candidate device-anchor base stations;

determine whether the second wireless device satisfies one or more predefined criteria for being a candidate device-anchor base station based on the information; and select the second wireless device as a candidate device-anchor base station if the second wireless device is determined to satisfy the one or more predefined criteria for being a candidate device-anchor base station; and effect selection of a device-anchor base station for the wireless device from the plurality of candidate device-anchor base stations such that communication between the serving base station of the wireless device and the wireless device is via the device-anchor base station.

27. The network node of claim 26 wherein, in order to select the plurality of candidate device-anchor base stations, the processor is further configured to receive information from the second wireless device that is indicative of whether the second wireless device is selected as a candidate device-anchor base station.

28. The network node of claim 26 wherein the wireless device is a Machine Type Communication, MTC, device located in a coverage hole.

29. The network node of claim 26 wherein the wireless device is a Machine Type Communication, MTC, device and a network load of the cell served by the serving base station of the wireless device is greater than a predefined threshold representative of a high network load.

* * * * *